US012639214B2

(12) United States Patent
Li et al.

(10) Patent No.: US 12,639,214 B2
(45) Date of Patent: May 26, 2026

(54) MEMORY SYSTEM AND OPERATING METHOD THEREOF, STORAGE MEDIUM

(71) Applicant: YANGTZE MEMORY TECHNOLOGIES CO., LTD., Wuhan (CN)

(72) Inventors: Qiyuan Li, Wuhan (CN); Lu Guo, Wuhan (CN); Jie Wan, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/912,348

(22) Filed: Oct. 10, 2024

(65) Prior Publication Data

US 2025/0370922 A1 Dec. 4, 2025

(30) Foreign Application Priority Data

May 28, 2024 (CN) .......................... 202410676594.1

(51) Int. Cl.
*G06F 12/00* (2006.01)
*G06F 12/02* (2006.01)

(52) U.S. Cl.
CPC ................................ *G06F 12/0246* (2013.01)

(58) Field of Classification Search
CPC ..... G06F 3/0619; G06F 3/0659; G06F 3/0679

USPC ........................................................ 711/103
See application file for complete search history.

(56) References Cited

U.S. PATENT DOCUMENTS

2025/0147667 A1 * 5/2025 Tang ...................... G06F 3/0659
2025/0147878 A1 * 5/2025 Tang ...................... G11C 29/42

FOREIGN PATENT DOCUMENTS

WO WO-2025175482 A1 * 8/2025 ........... G06F 3/0659

* cited by examiner

*Primary Examiner* — Mardochee Chery
(74) *Attorney, Agent, or Firm* — Conley Rose, P.C.

(57) ABSTRACT

Examples of the present disclosure provide a memory system and operating method thereof, storage medium. Wherein the memory system includes: a memory device including multiple memory cells, a preset number of the memory cells forming a codeword; a memory controller coupled to the memory device and configured to: obtain a first read result of the codeword at a first read level; according to the decoding failure of the first read result, obtain a second read result of the codeword at a second read level, wherein the first read level is different from the second read level; and perform decoding processing on the second read result based on the flipping result, wherein the flipping result includes information of the bits of the codeword flipped in the first read result and the second read result.

20 Claims, 17 Drawing Sheets

100

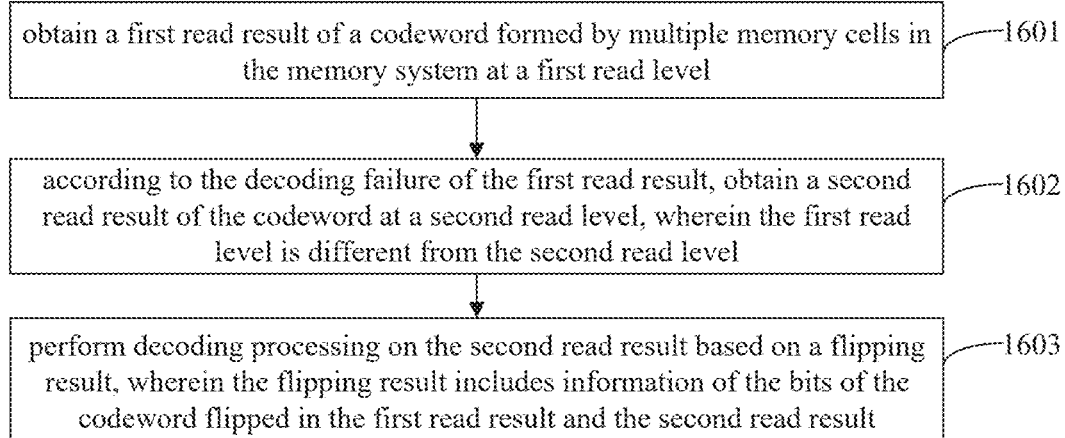

obtain a first read result of a codeword formed by multiple memory cells in the memory system at a first read level —1601 according to the decoding failure of the first read result, obtain a second read result of the codeword at a second read level, wherein the first read level is different from the second read level —1602 perform decoding processing on the second read result based on a flipping result, wherein the flipping result includes information of the bits of the codeword flipped in the first read result and the second read result —1603

FIG. 16

MEMORY SYSTEM AND OPERATING METHOD THEREOF, STORAGE MEDIUM

CROSS-REFERENCE TO RELATED APPLICATIONS

This patent application claims priority to Chinese Patent Application No. 2024106765941, which was filed on May 28, 2024 and is incorporated herein by reference in its entirety.

TECHNICAL FIELD

Examples of the present application relate to the field of semiconductor technology, and in particular to a memory system and an operating method thereof, and a storage medium.

BACKGROUND

A memory device is a storage device used to save information in modern information technology. As a typical non-volatile semiconductor memory, Not-And (NAND) type memory has gradually become a mainstream product in the storage market due to its high storage density, controllable production cost, suitable programming and erasing speed, and retention characteristics.

SUMMARY

In view of this, examples of the present disclosure provide a memory system and an operating method thereof, and a storage medium.

In a first aspect, an example of the present application provides a memory system, the memory system includes: a memory device including multiple memory cells, a preset number of the memory cells forming a codeword; a memory controller coupled to the memory device and configured to: obtain a first read result of the codeword at a first read level; according to a decoding failure of the first read result, obtain a second read result of the codeword at a second read level, wherein the first read level is different from the second read level; and perform decoding processing on the second read result based on a flipping result, wherein the flipping result includes information of the bits of the codeword flipped in the first read result and the second read result.

In some examples, the memory controller is configured to: after obtaining the second read result of the codeword at the second read level, perform decoding processing on the second read result; according to a decoding failure of the second read result, perform decoding processing on the second read result based on the flipping result.

In some examples, each data bit in the first read result and the second read result participates in check calculation of multiple check equations, and the memory controller is configured to: for each of all the bits flipped in the flipping result, update the error count of the check equations in which each bit participates during the decoding processing; select a bit, among all the bits, which participates in the check equations with an error count satisfying a preset condition, and flip the value of the selected bit in the second read result; and continue the decoding processing based on the flipped data.

In some examples, the memory controller is configured to: select a bit, among all the bits, which participates in the check equations with a highest error count; or, select a bit, among all the bits, which participates in the check equations with an error count greater than or equal to a preset value.

In some examples, the memory controller is configured to: go through multiple data check iterations during the decoding processing on the second read result, wherein data flipping is performed based on the flipping result in one of the data check iterations, or data flipping is performed based on the flipping result in each of the data check iterations.

In some examples, the memory controller is configured to: for each of all the bits flipped in the flipping result, increasing, by 1, the error count of the check equations in which each bit participates during the decoding processing.

In some examples, the memory controller is configured to: perform logical operation on the first read result and the second read result to generate the flipping result.

In some examples, the memory device is configured to: perform a logical operation on the first read result and the second read result to generate the flipping result; and send the flipping result to the memory controller.

In some examples, the memory device further includes a first latch, a second latch and a third latch; wherein the first latch is configured to store first read data; the second latch is configured to store second read data; the third latch is configured to perform a logical operation on the first read result and the second read result to generate the flipping result.

In some examples, the memory controller is configured to: obtain the first read level and the second read level, wherein the difference between the second read level and the first read level is less than a preset voltage.

In some examples, the memory controller is configured to: after obtaining the first read result and the second read result, perform first decision decoding processing on the first read result respectively; based on the flipping result, perform the first decision decoding processing on the second read result; and according to a failure of performing the first decision decoding processing on the second read result based on the flipping result, perform second decision decoding processing on the second read result, wherein the processing efficiency of the second decision decoding processing is lower than the processing efficiency of the first decision decoding processing.

In a second aspect, an example of the present application provides an operating method for a memory system, the operating method for a memory system includes: obtaining a first read result of a codeword formed by multiple memory cells in the memory system at a first read level; according to decoding failure of the first read result, obtaining a second read result of the codeword at a second read level wherein the first read level is different from the second read level; and performing decoding processing on the second read result based on the flipping result, wherein the flipping result includes information of the bits of the codeword flipped in the first read result and the second read result.

In some examples, each data bit in the first read result and the second read result participates in the check calculation of multiple check equations, the method further includes: after obtaining the second read result of the codeword at the second read level, performing decoding processing on the second read result; according to a decoding failure of the second read result, performing decoding processing on the second read result based on the flipping result.

In some examples, the performing decoding processing on the second read result based on the flipping result includes: for each of all the bits flipped in the flipping result, updating the error count of the check equations in which each bit participates during the decoding processing; selecting a bit, among all the bits, which participates in the check equations with an error count satisfying a preset condition, and flipping the value of the selected bit in the second read result; and continuing the decoding processing based on the flipped data.

In some examples, selecting a bit, among all the bits, which participates in the check equations with an error count satisfying a preset condition includes: selecting a bit, among all the bits, which participates in the check equations with a highest error count; or, selecting a bit, among all the bits, which participates in check equations with an error count greater than or equal to a preset value.

In some examples, the method further includes: going through multiple data check iterations during the decoding processing on the second read result, wherein data flipping is performed based on the flipping result in the first one of the data check iterations, or data flipping is performed based on the flipping result in each of the data check iterations.

In some examples, updating the error count of the check equations in which each bit participates during the decoding processing for each of all the bits flipped in the flipping result includes: for each of all the bits flipped in the flipping result, increasing, by 1, the error count of the check equations in which each bit participates during the decoding processing.

In some examples, the method further includes: performing a logical operation on the first read result and the second read result to generate the flipping result.

In some examples, the method further includes: receiving the flipping result generated by the memory device in the memory system.

In some examples, the method further includes: obtaining the first read level and the second read level, wherein the difference between the second read level and the first read level is less than a preset voltage.

In some examples, the method further includes: after obtaining the first read result and the second read result, performing first decision decoding processing on the first read result respectively; based on the flipping result, performing first decision decoding processing on the second read result; and according to a failure of performing first decision decoding processing on the second read result based on the flipping result, performing second decision decoding processing on the second read result, wherein the processing efficiency of the second decision decoding processing is lower than the processing efficiency of the first decision decoding processing.

In a third aspect, an example of the present application provides a storage medium having executable instructions stored thereon, and the executable instructions, when executed, may implement the operations of the operating methods in the examples of the present application.

In examples of the present application, the memory controller in the memory system obtains a first read result of a codeword at a first read level; according to the decoding failure of the first read result, obtains a second read result of the codeword at a second read level different from the first read level; and performs decoding processing on the second read result based on the flipping result including information of the bits of the codeword flipped in the first read result and the second read result. A memory cell in the memory system with a threshold voltage between the first read level and the second read level has a relatively high probability of error, therefore, the flipping result of the first read result corresponding to the first read level and the second read result corresponding to the second read level may be used as soft information to assist hard decoding, in this way, the data of each read operation may be fully utilized to improve the decoding capability and decoding efficiency without performing additional read operations.

BRIEF DESCRIPTION OF THE DRAWINGS

In the accompanying drawings, unless otherwise specified, same reference numbers refer to same or similar parts or elements throughout multiple accompanying drawings. The accompanying drawings are not necessarily be drawn to scale. It should be understood that these accompanying drawings depict only some implementations disclosed in accordance with the present application and should not be considered as limitation of the scope of the present application.

FIG. 16 is a schematic diagram of the implementation process of an operating method that a memory controller is configured to perform according to an example of the present application;

DETAILED DESCRIPTION

Figure 1:
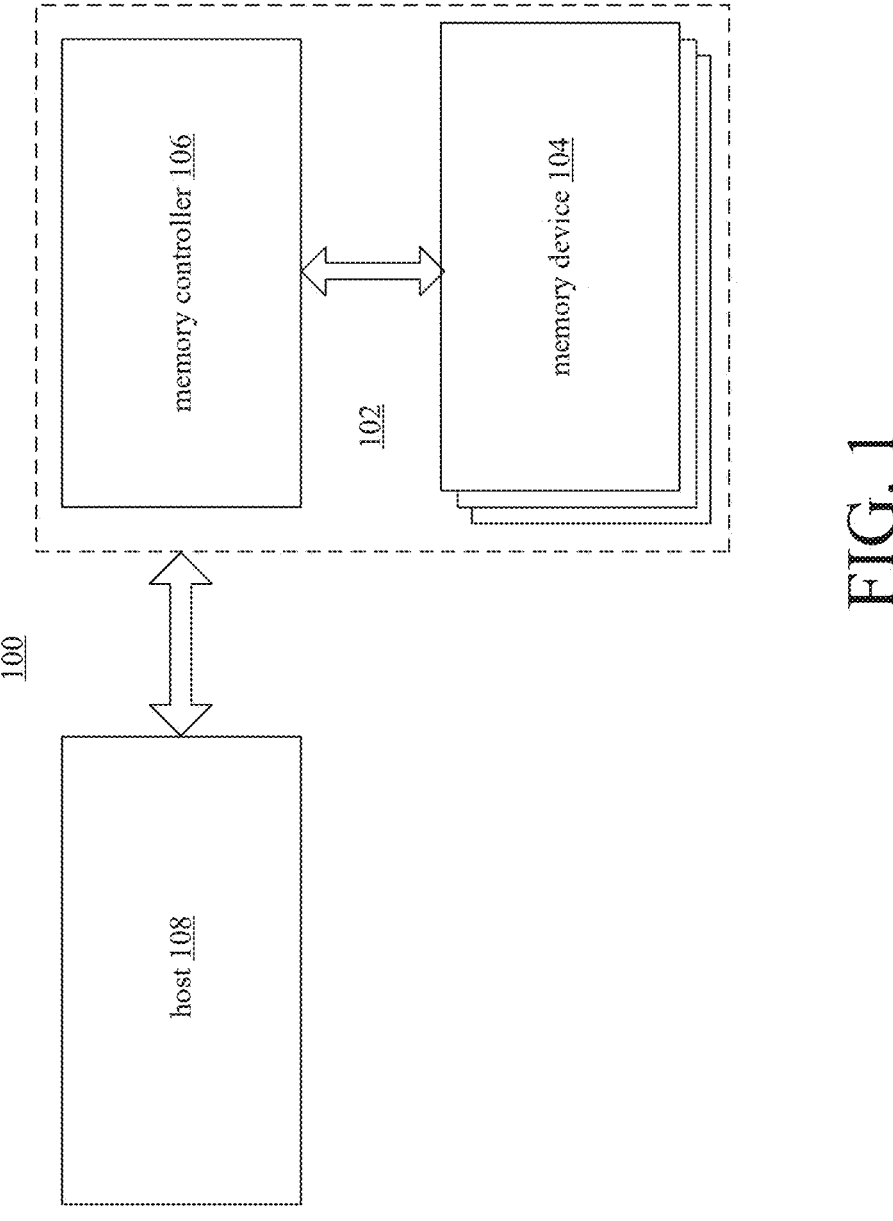
FIG. 1 is a schematic diagram of an example system with a memory system according to an example of the present application.

Example implementations disclosed in the present application will be described in more detail below with reference to the accompanying drawings. Although example implementations of the present application are shown in the accompanying drawings, it should be understood that the present application may be implemented in various forms and should not be limited to the specific implementations set forth herein. Rather, these implementations are provided so that the present application can be more thoroughly understood and the scope of the present application can be fully conveyed to those skilled in the art.

In the following description, numerous specific details are given in order to provide a more thorough understanding of the present application. However, it will be apparent to one skilled in the art that the present application may be practiced without one or more of these details. In other examples, in order to avoid confusion with the present application, some technical features known in the art are not described; that is, not all features of the actual example are described here, and well-known functions and structures are not described in detail.

Furthermore, accompanying drawings are merely schematic illustrations of the present application and are not necessarily drawn to scale. Same reference numerals in the accompanying drawings represent same or similar parts, and thus repeated description thereof will be omitted. Some of the block diagrams shown in the accompanying drawings are functional entities and do not necessarily correspond to physically or logically separate entities. These functional entities may be implemented in software form, or implemented in one or more hardware modules or integrated circuits, or implemented in different networks and/or processor devices and/or microcontroller devices.

The flowcharts shown in the accompanying drawings are illustrative only and do not necessarily include all operations. For example, some operations may be decomposed, and some operations may be merged or partially merged, thus the actual order of execution may change according to the actual situation.

A term used herein is for the purpose of describing a particular example only and is not to be considered as limitation of the present application. As used herein, the singular forms of "a", "an" and "said/the" are intended to include the plural forms as well, unless the context clearly dictates otherwise. It should also be understood that the terms "consists of" and/or "comprising", when used in this description, identify the presence of the said features, integers, steps, operations, elements and/or parts, but do not exclude the presence of one or more other features, integers, steps, operations, elements, parts and/or groups. As used herein, the term "and/or" includes any and all combinations of the associated listed items.

Memory devices in examples of the present application include but are not limited to a three-dimensional NAND memory, and for ease of understanding, a three-dimensional NAND memory is used as an example for illustration.

FIG. 1 illustrates a block diagram of an example system 100 with memory devices in accordance with some aspects of the present application. The system 100 may be a mobile phone, a desktop computer, a laptop computer, a tablet, a vehicle computer, a gaming console, a printer, a positioning device, a wearable electronic device, a smart sensor, a Virtual Reality (VR) device, an Augment Reality (AR) device, or any other suitable electronic devices having memory devices therein. As shown in in FIG. 1, system 100 may include a host 108 and a memory system 102, and the memory system 102 has one or more memory devices 104 and a memory controller 106. The host 108 may be a processor (e.g., a Central Processing Unit (CPU)) or a System of Chip (SoC) (e.g., an Application Processor (AP)) of an electronic device. Host 108 may be configured to send data to or receive data from memory device 104.

According to some implementations, memory controller 106 is coupled to memory device 104 and host 108 and is configured to control memory device 104. Memory controller 106 may manage data stored in memory device 104 and communicate with host 108. In some implementations, the memory controller 106 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc.

In some implementations, the memory controller 106 is designed to operate in high duty cycle environment Solid State Drive (SSD) or Embedded Multi Media Card (eMMC), wherein SSD or eMMC serve as data memory for mobile devices such as smartphone, tablet computer, laptop computer, and enterprise memory array.

Memory controller 106 may be configured to control operations of memory device 104, e.g., read, erase and program operations. Memory controller 106 may also be configured to manage various functions related to data stored or to be stored in memory device 104, including but not limited to bad block management, garbage collection, logical-to-physical address translation, wear leveling, etc. In some implementations, memory controller 106 is also configured to process error correction code related to data read from or written to memory device 104.

The memory controller 106 may also perform any other suitable functions, e.g., formatting the memory device 104. Memory controller 106 may communicate with external devices (e.g., host 108) according to a particular communication protocol. For example, the memory controller 106 may communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 106 and one or more memory device 104 may be integrated into various types of storage devices, e.g., included in the same package (e.g., Universal Flash Storage (UFS) package or eMMC package). That is, memory system 102 may be implemented and packaged into different types of terminal electronic products.

Figure 2A:
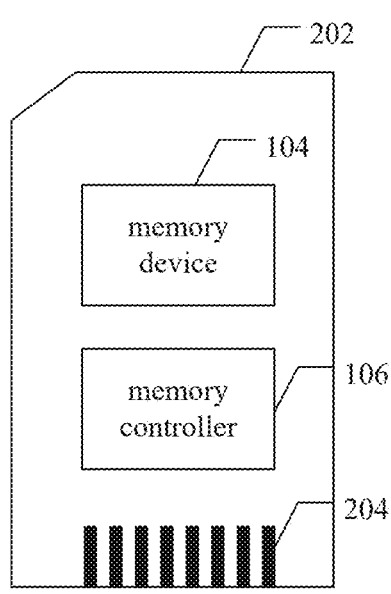
FIG. 2A is a schematic diagram of an example memory card with a memory system according to an example of the present application.

In one example as shown in FIG. 2A, memory controller 106 and a single memory device 104 may be integrated into a memory card 202. Memory card 202 may include a PC card (PCMCIA, personal computer memory card international association), a CF card, a smart media (SM) card, a memory stick, a multimedia card (MMC, RS-MMC, MMC-micro), an SD card (SD, miniSD, microSD, SDHC), a UFS, etc. Memory card 202 may further include a memory card connector 204 coupling memory card 202 with a host (e.g., host 108 in FIG. 1).

Figure 2B:
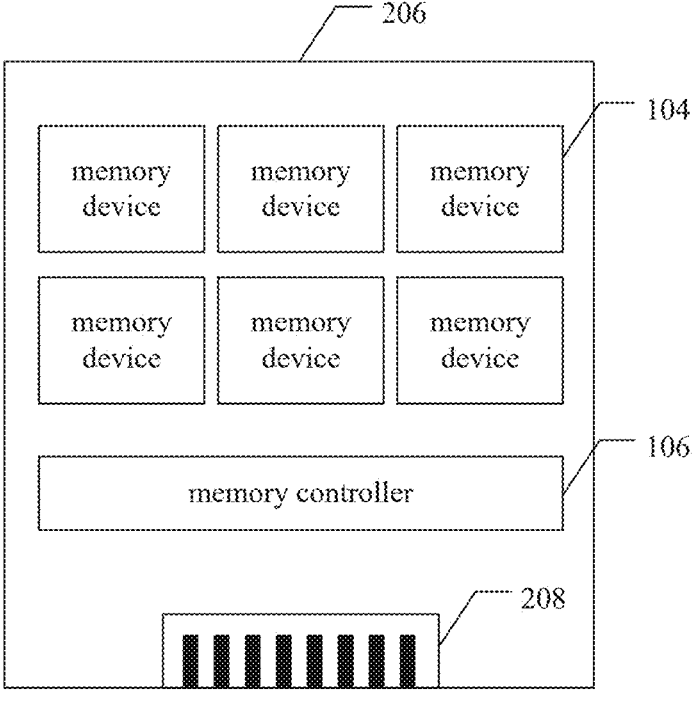
FIG. 2B is a schematic diagram of an example solid state drive with a memory system according to an example of the present application.

In another example as shown in FIG. 2B, memory controller 106 and multiple memory devices 104 may be integrated into a SSD 206. SSD 206 may further include an SSD connector 208 coupling the SSD 206 with a host (e.g., host 108 in FIG. 1). In some implementations, the storage capacity and/or operating speed of SSD 206 is greater than the storage capacity and/or operating speed of memory card 202.

In some examples, each memory block may be coupled to multiple word lines, and multiple memory cells coupled to each word line constitute a physical page.

Figure 3:
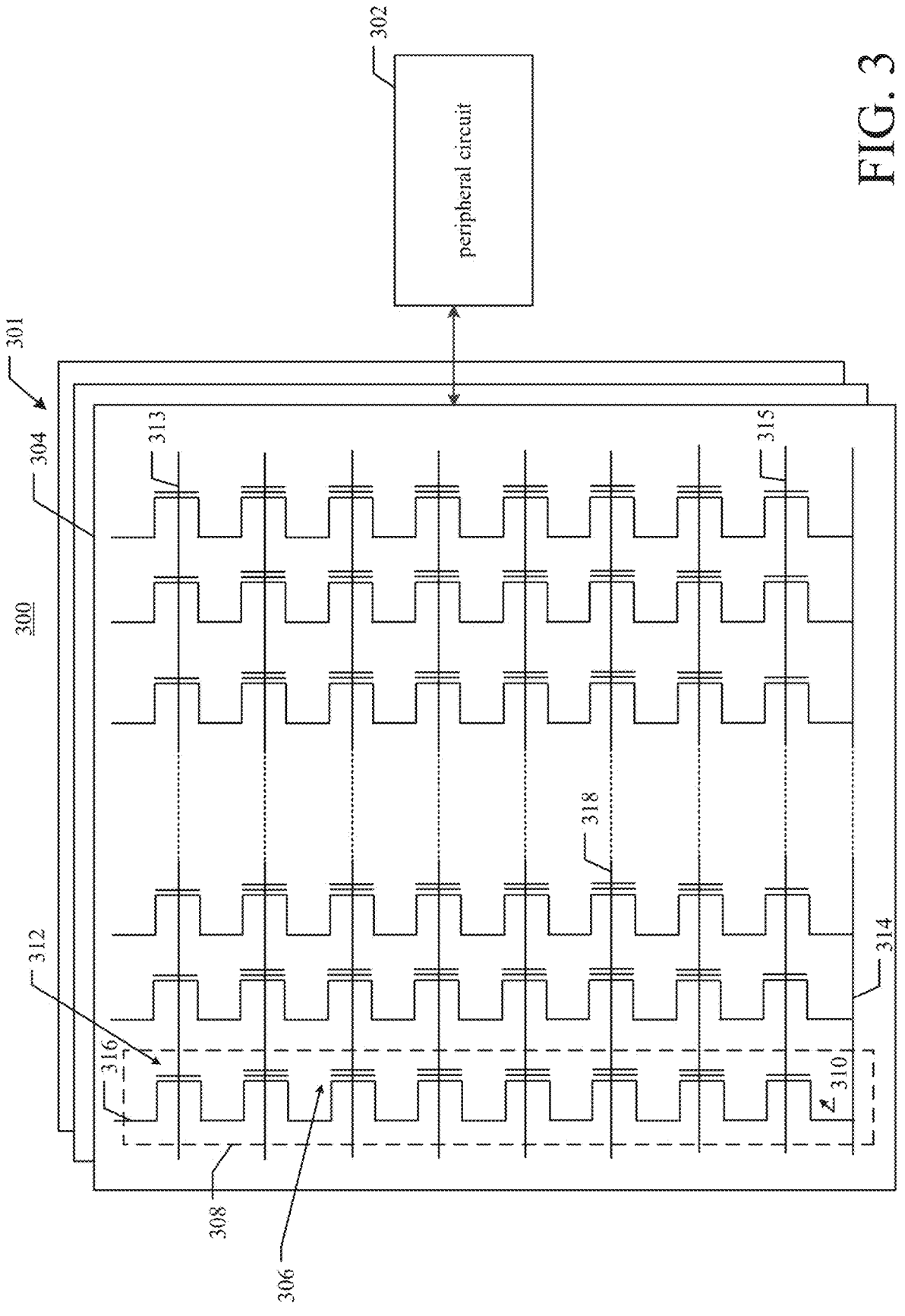
FIG. 3 is a schematic diagram of an example memory including peripheral circuits according to an example of the present application.

FIG. 3 illustrates a schematic circuit diagram of an example memory device 300 including peripheral circuitry according to some aspects of the present application. Memory device 300 may be an example of memory device 104 in FIG. 1. The memory device 300 may include a memory cell array 301 and a peripheral circuit 302 coupled to the memory cell array 301. Taking memory cell array 301 being a three-dimensional NAND memory cell array as an example for illustration, wherein memory cells 306 is a NAND-type memory cell, and memory cells 306 are provided in the form of an array of memory strings 308, each memory string 308 extending vertically over a substrate (not shown). In some implementations, each memory string 308 includes multiple memory cells 306 coupled in series and stacked vertically. Each memory cell 306 may retain a continuous analog value, e.g., voltage or charge, depending on the number of electrons trapped within the region of the memory cell 306. Each memory cell 306 may be a "floating gate" type memory cell including a floating gate transistor, or a "charge trapping" type memory cell including a charge trapping transistor.

In some implementations, each memory cell 306 is a Single-level Cell (SLC) that has two possible memory states and may thus store one bit of data. For example, a first memory state of "0" may correspond to a first voltage range, and a second memory state of "1" may correspond to a second voltage range. In some implementations, each memory cell 306 is a Multi-Level Cell (MLC) capable of storing more than a single bit of data in more than four memory states. For example, an MLC may store two bits per cell (also known as a Double-Level Cell), three bits per cell (also known as a Trinary-Level Cell (TLC)), four bits per cell (also known as a Quad-Level Cell (QLC)), five bits per cell (also known as a Penta-level cell (PLC)), or more than five bits per cell. Each MLC can be programmed to adopt a range of possible nominal storage values. In one example, if each MLC stores two bits of data, the MLC can be programmed to adopt one of three possible programming levels from the erasing state through writing one of three possible nominal storage values into the cell, the fourth nominal storage value may be used for the erasing state.

It should be noted that the storage state mentioned here is also the storage state of the memory cell mentioned in this application. Different memory cells have different numbers of storage states. e.g., a SLC type memory cell has 2 storage states (i.e., two memory states), where the 2 storage states include one program state and one erase state. As another example, a MLC type memory cell has 4 storage states, where the four storage states include one erase state and three program states. As yet another example, a TLC type memory cell has 8 storage states, where the 8 storage states include one erase state and seven program states. In some implementation, a QLC type memory cell has 16 storage states, where the 16 storage states include one erase state and fifteen program states.

As shown in FIG. 3, each memory string 308 may include a bottom selective gate (BSG) 310 (also referred to as a source side selective gate) at its source terminal and a top selective gate (TSG) 312 (also referred to as a drain side selective gate) at its drain terminal. BSG 310 and TSG 312 may be configured to activate the selected memory cell string 308 during read operation and program operation. In some implementations, the sources of memory strings 308 in a same memory block 304 are coupled through a same source line (SL) 314 (e.g., a common SL). In other words, according to some implementations, all memory strings 308 in a same memory block 304 have an array common source (ACS). According to some implementations, TSG 312 of each memory string 308 is coupled to a corresponding bit line (BL) 316 from which data may be read or written via an output bus (not shown). In some implementations, each memory string 308 is configured to be selected or deselected through applying a select voltage (e.g., above the threshold voltage of a transistor with a TSG 312) or a deselect voltage (e.g., 0V) to the corresponding TSG 312 via one or more TSG lines 313 and/or applying a select voltage (e.g., above the threshold voltage of a transistor with a BSG 310) or a deselect voltage (e.g., 0V) to the corresponding BSG 310 via one or more BSG lines 315.

As also shown in FIG. 3, a memory string 308 may be organized into multiple memory blocks 304, each of which may have a common source line 314 (e.g., coupled to ground). In some implementations, each memory block 304 is the basic data unit for an erase operation, i.e., all memory cells 306 on the same memory block 304 are erased simultaneously. To erase the memory cell 306s in the selected memory block 304, the source line 314 coupled to the selected memory block 304 and to the unselected memory blocks 304 in the same plane as the selected memory block 304 may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of a memory block. The memory cells 306 of adjacent memory strings 308 may be coupled through a word line 318 that selects which row of memory cells 306 is affected by read and program operations.

Referring to FIG. 3, each memory cell 306 of the multiple memory cells is coupled to a corresponding word line 318, and each memory string 308 is coupled to a corresponding bit line 316 through a corresponding selective transistor (e.g., top selective transistor (TSG) 312).

Figure 4:
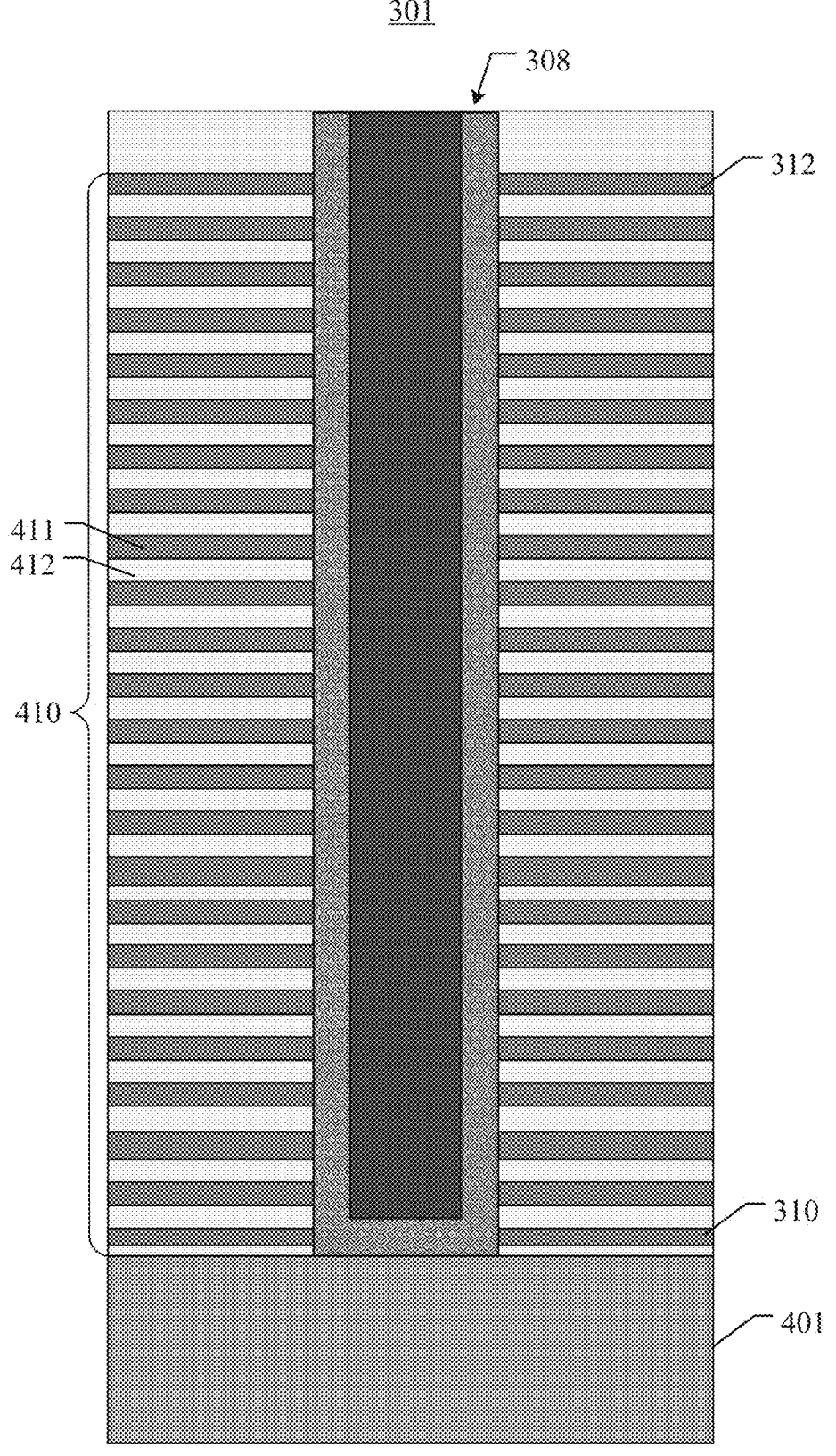
FIG. 4 is a schematic cross-sectional view of a memory cell array including NAND-type memory strings according to an example of the present application.

FIG. 4 illustrates a schematic cross-sectional view of an example memory cell array 301 including memory strings 308, e.g., NAND, according to some aspects of the present application. As shown in FIG. 4, the NAND memory cell array 301 may include a stacked structure 410, the stacked structure 410 includes multiple gate layers 411 and multiple insulating layers 412 alternately stacked in sequence, and the channel structure vertically penetrating through the gate layers 411 and the insulating layers 412, wherein the channel structure is coupled to each gate layer to form a memory cell, and the channel structure is coupled to multiple gate layers in the stacked structure 410 to form the memory string 308. Gate layers 411 and the insulating layers 412 may be stacked alternately, and two adjacent gate layers 411 are separated by an insulating layer 412.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some implementations, each gate layer 411 includes a metal layer, e.g., a tungsten layer. In some implementations, each gate layer 411 includes a doped polysilicon layer. Each gate layer 411 may include a control gate surrounding a memory cell. A gate layer 411 at the top of the stacked structure 410 may extend laterally as an upper selective gate line, a gate layer 411 at the bottom of a stacked structure 410 may extend laterally as a lower selective gate line, and a gate layer 411 extending laterally between a upper selective gate line and a lower selective gate line may serve as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with semiconductor material (s) (e.g., as a semiconductor channel) and dielectric material (s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A blocking layer may include silicon oxide, silicon oxynitride, a high dielectric constant (high-k) dielectric, or any combination thereof. In one example, a memory film may include a composite layer of silicon oxide/silicon oxynitride/silicon oxide (ONO).

Figure 5:
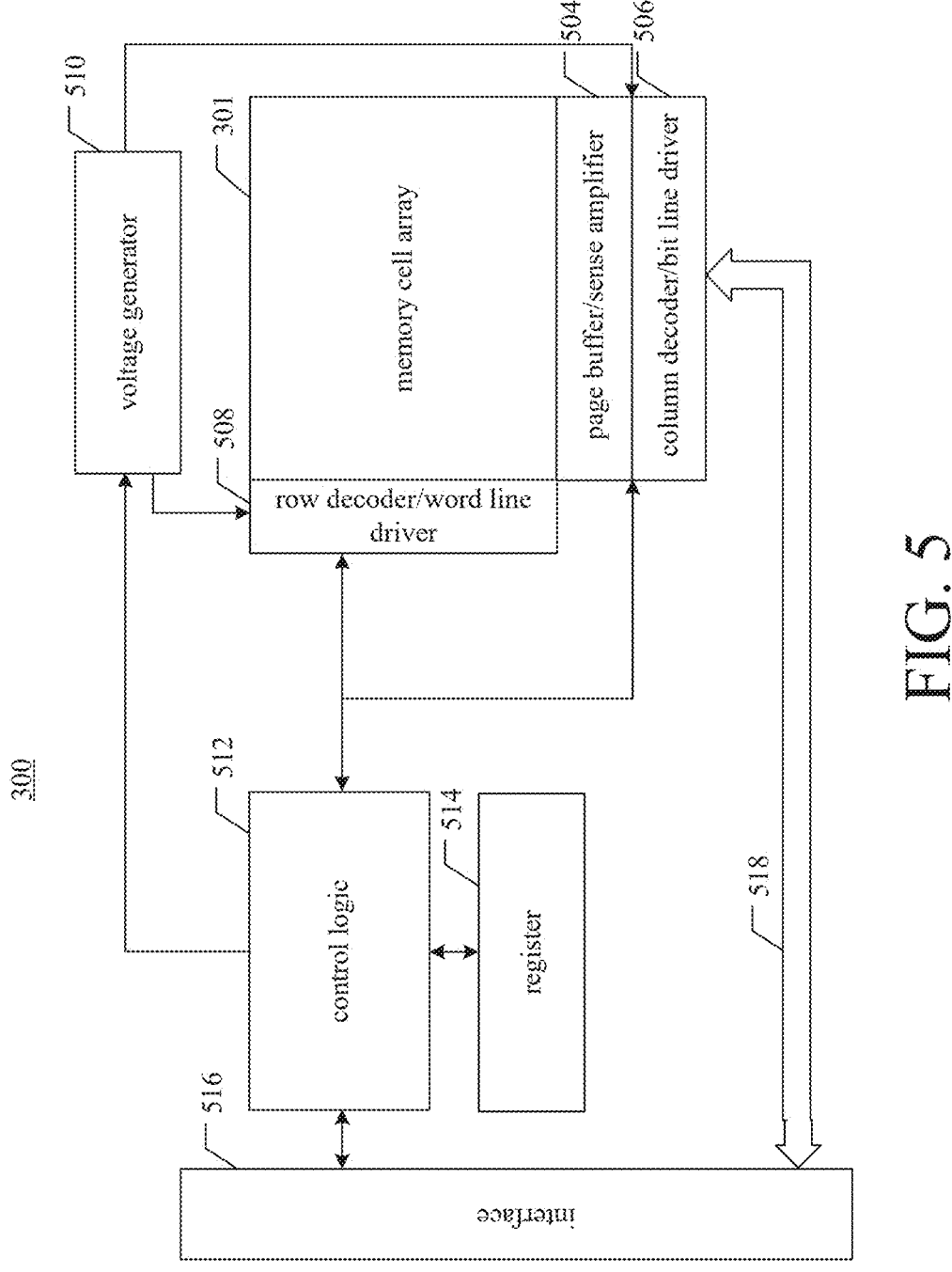
FIG. 5 is a schematic diagram of an example memory device including a memory cell array and peripheral circuits according to an example of the present application.

Referring back to FIG. 3, the peripheral circuit 302 may be coupled to the memory cell array 301 through bit line 316, word line 318, source line 314, BSG line 315, and TSG line 313. The peripheral circuit 302 may include any suitable analog, digital, and mixed-signal circuit for facilitating operation of the memory cell array 301 through applying a voltage signal and/or a current signal to each target memory cell 306 and sensing voltage signal and/or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some example peripheral circuits, the peripheral circuits includes page buffer/sense amplifier 504, column decoder/bit line driver 506, row decoder/word line driver 508, voltage generator 510, control logic 512, register 514, interface 516 and data bus 518. It should be understood that in some examples, additional peripheral circuits not shown in FIG. 5 may also be included.

The page buffer/sense amplifier 504 may be configured to read data from the memory cell array 301 and program (write) data to the memory cell array 301 according to control signals from the control logic 512. In one example, the page buffer/sense amplifier 504 may store programming data to be programmed into the memory cell array 301 (write data). In another example, the page buffer/sense amplifier 504 may perform a programming verification operation to ensure that data has been correctly programmed into memory cells 306 coupled to selected word line 318. In yet another example, the page buffer/sense amplifier 504 may also sense a low power signal from bit line 316 representing a data bit stored in memory cell 306 and amplify a small voltage swing to a recognizable logic level during a read operation. The column decoder/bit line driver 506 may be configured to be controlled by control logic 512 and to select one or more memory strings 308 through applying a bit line voltage obtained from voltage generator 510.

The row decoder/word line driver 508 may be configured to be controlled by control logic 512 and select/deselect memory block 304 of memory cell array 301 and select/deselect word line 318 of memory block 304. The row decoder/word line driver 508 may also be configured to drive word line 318 with a word line voltage obtained from voltage generator 510. In some implementations, the row decoder/word line driver 508 may also select/deselect and drive the BSG line 315 and the TSG line 313. As described in detail below, the row decoder/word line driver 508 is configured to perform program operations on the memory cells 306 coupled to the (one or more) selected word line 318. The voltage generator 510 may be configured to be controlled by the control logic 512, and obtain word line voltage (e.g., read voltage or read level, program voltage, pass voltage, channel boost voltage, verification voltage, etc.), bit line voltage and source line voltage to be supplied to the memory cell array 301.

The control logic 512 may be coupled to each of other portions of the peripheral circuit described above, and configured to control operations of each of the other portions of the peripheral circuit. The register 514 may be coupled to the control logic 512 and include status register, command register and address register for storing status information, command operation code (OP code) and command address for controlling operations of each of the peripheral circuits. The interface 516 may be coupled to control logic 512 and act as a control buffer to buffer control commands received from a host (not shown) and relay them to control logic 512 and to buffer status information received from the control logic 512 and relay it to the host. Interface 516 may also be coupled to column decoder/bit line driver 506 via data bus 518 and act as a data I/O interface and data buffer to buffer and relay data to/from memory cell array 301.

The basic principle of a three-dimensional NAND memory is that charge carriers (electrons or electron holes) cross the charge barrier and inject a certain amount of charges into a memory cell to complete the process of data write, the stored data may then be read according to the threshold voltage when the memory cell is turned on. Therefore, in order to read correct data, an ECC error correction algorithm with strong error correction capability and high efficiency is usually introduced when reading data.

However, as the using time increases, the charges stored in the memory unit will change with the increase of using time, repeated read operations, cross temperature, etc., therefore affecting the accuracy of data reading. When the threshold voltage shifts upward or downward significantly, when the original read level is being used to read the data of the memory cell, the possibility of occurring read error will be very high, and a read error exceeding the ECC error correction capability will also cause the data reading of the memory cell to fail.

The error correction codes involved in the examples of the present application include but are not limited to Low Density Parity-check Code (LDPC), and the following description will only take LDPC as an example for illustration.

Figure 6:
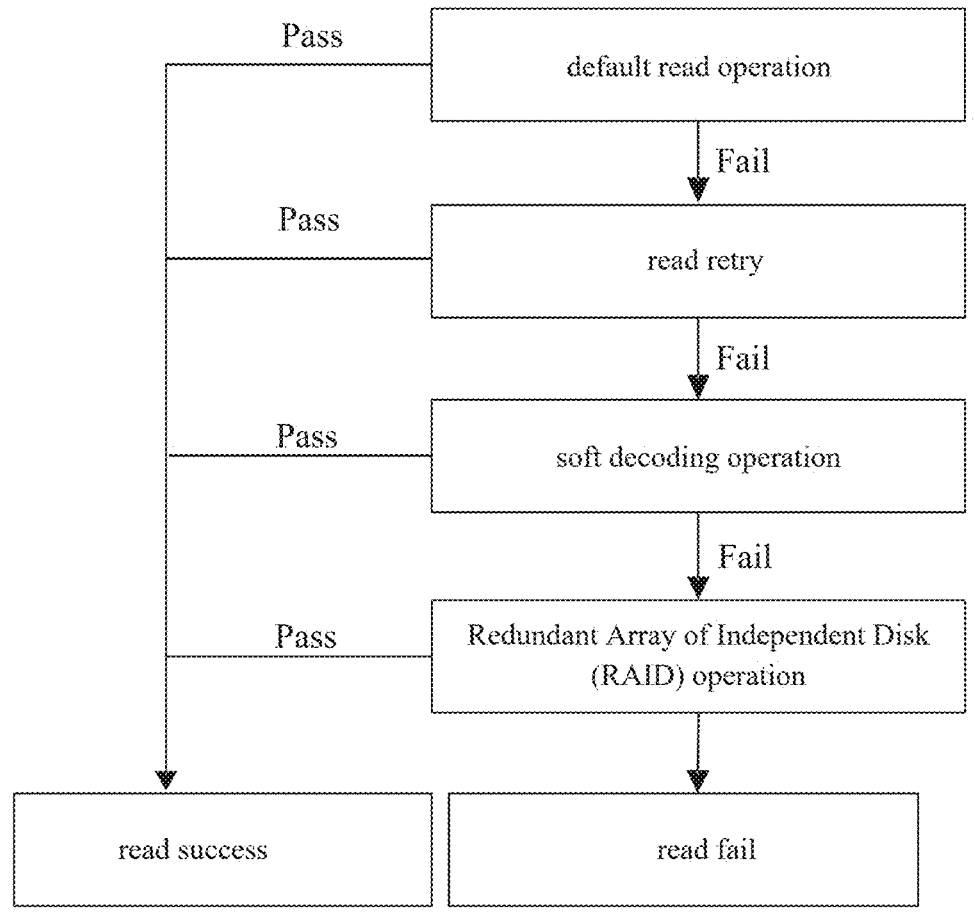
FIG. 6 is a schematic diagram 1 of an example read operation flow of a memory system according to an example of the present application.

FIG. 6 illustrates a schematic diagram of an example read operation flow of a memory system. In conjunction with what is shown in FIG. 6, when the memory controller controls the memory device to perform a read operation, a default read operation (FW) is first performed on the memory cell at the corresponding physical address; if the default read operation fails, a read retry operation is performed; after the read retry operation fails, a soft decoding operation (or referred to as soft decision decoding) is performed; after the soft decoding failures, a Redundant Array of Independent Disk (RAID) operation is performed; and after the RAID operation fails, the read operation stops and the read fails because the error cannot be corrected, then the memory controller sends a read fail signal to the host 108. Read retry operation and default read operation may be applicable to hard decode or referred to as soft decision decoding. It is to be noted that soft decision decoding has a stronger error correction capability than hard decision decoding, but it consumes longer time on average and occupies more resources.

In some implementations, the read retry operation may usually be performed through querying the retry table (or referred to as a trial and error table) provided by the manufacturer. The essence of the read retry operation is an error correction mechanism, the retry table may provide a reference voltage for reading data, which attempts to read each memory cell again with a read level that deviates from the normal threshold voltage through querying the retry table, and performs error correction in combination with error correction algorithm, thereby attempting to read the data correctly. If the erroneous read data is corrected, query for the retry table is stopped. If the erroneous read data cannot be corrected, the retry table will be queried until the entire retry table is traversed.

The read retry operation described above requires querying the retry table item by item, which will inevitably increase the number of retry and take a long time. In addition, the retry table provided by the manufacturer is only a reference value in some specific environments, and the real usage scenarios are ever-changing, therefore, many scenarios cannot be covered by the retry table provided by the manufacturer, therefore, even if the retry table is traversed, the data may not be corrected, resulting in a lot of wasted time to process the command. In summary, the method of performing the read retry operation through repeatedly polling the retry table takes a long time, affects the response time of subsequent commands, and thus affects the performance of the device.

Figure 7:
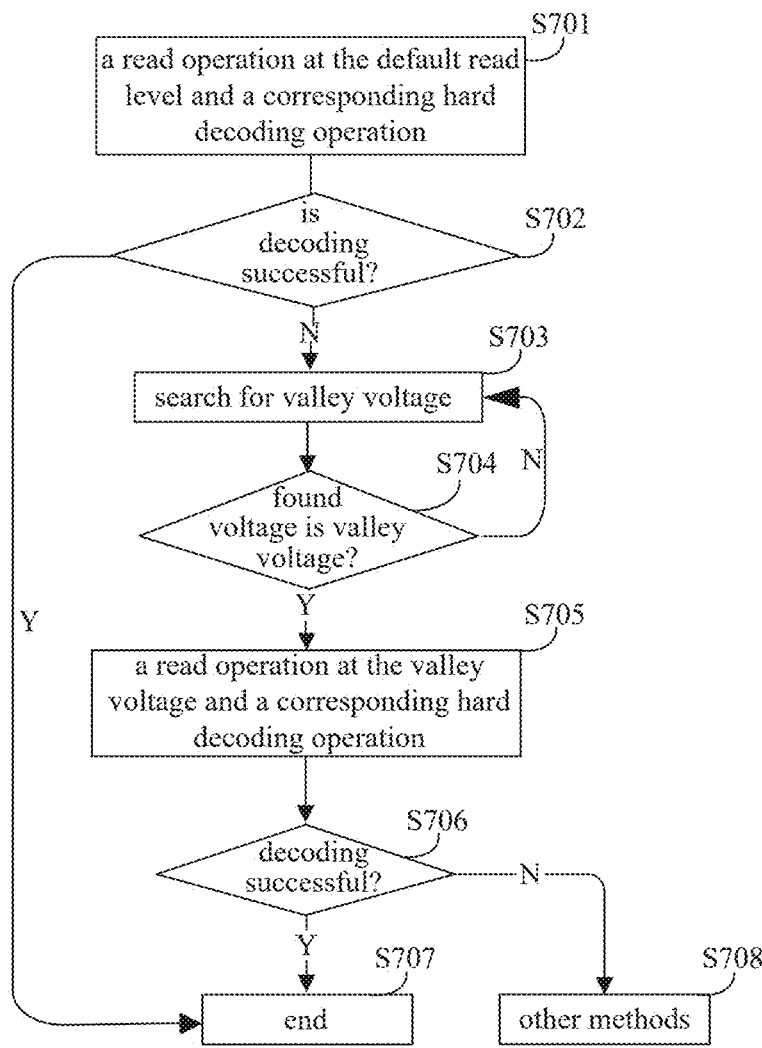
FIG. 7 is a schematic diagram 2 of an example read operation flow of a memory system according to an example of the present application.

FIG. 7 illustrates a schematic diagram of an example read operation flow of another memory system. As shown in FIG. 7, when the memory controller controls the memory device to perform a read operation, operation S701 is performed on the memory cell of the corresponding physical address: a read operation at the default read level (default read) and a corresponding hard decoding operation (Hard decode). Next, operation S702 is performed: determining whether the hard decoding corresponding to the read operation at the default read level is successful. When the hard decoding corresponding to the read operation at the default read level is successful, operation S707 is performed: terminating the read operation; when the hard decoding corresponding to the read operation at the default read level fails, operation S703 is performed: searching for the valley voltage and operation S704 is performed: determining whether the found voltage is the valley voltage, at this point, the iterative operation of searching may be performed repeatedly until the valley voltage is found. Next, operation S705 is performed: a read operation at the valley voltage and a corresponding hard decoding operation. Next, operation S706 is performed: determining whether the hard decoding corresponding to the read operation at the valley voltage is successful. When the hard decoding corresponding to the read operation at the valley voltage is successful, operation S707 is performed: terminating the read operation; and when the hard decoding corresponding to the read operation at the valley voltage fails, operation S708 is performed: employing other methods to perform error correction on the read operation, e.g., the aforementioned soft decoding operation.

Here, the default read level may be a read level provided by the firmware according to recorded information of the memory device, e.g., experienced scene information, the default read level may be an empirical value, or may be a default value configured when the memory device leaves the factory, the empirical value or the default value is obtained through extensive simulation experiments before the memory device leaves the factory.

Here, the valley voltage may also be referred to as the best read level, and may be a read level that is found by the firmware according to the current read data situation of the memory device (e.g., the read result at the default read level) and in combination with a certain strategy and is considered by the strategy to be the most suitable one for the current situation.

In some examples, the best read level (valley voltage) may be found through various strategies. In some examples, through counting the number of bits flipped in two read results of the codeword including a preset number of memory cells at the corresponding read level and the nearby voltage of the corresponding read level (the corresponding read level generally refers to any read level required to obtain the first result, and the difference between the nearby voltage and the corresponding read level is less than a preset voltage range, e.g., the preset voltage range may be 5 mV to 20 mV) as a first result, and according to the first results corresponding to at least one codeword at a target read level (generally referring to any read level, e.g., may be a default read level or other read levels), adjusting the target read level to obtain the first results corresponding to at least one codeword at the adjusted read level, and determine the valley voltage according to the multiple first results (e.g., when a first result among the multiple first results is smaller than or equal to a preset value, the read level corresponding to the smallest first result among the multiple first results is used as the valley voltage). In this way, it is able to effectively avoid the problems of long time consumption and incomplete scene coverage caused by using the retry table, and to save the space occupied by the retry table, find the valley voltage more quickly and accurately, thereby effectively reducing the time delay in determining the valley voltage.

However, during the use of the memory system, the experienced different usage scenarios, e.g., long time data retention, repeated read operations, cross-temperature environment, whether the memory block is fully written with data, the number of program times and erase times of the memory cell, etc., each will cause the threshold voltage distribution of the memory cell in the memory system to shift (VT shift), although the firmware will provide a suitable default read level according to relevant information, it is impossible to guarantee that the corresponding read results at the default read level can be decoded successfully in every case, especially when the above-mentioned multiple scenarios are superimposed, the probability of read fail increases greatly. However, the hard decoding capability of the memory system is limited, and the decoding efficiency of soft decoding is low, which has a great impact on the performance of the memory system. Based on this, improving the decoding capability of hard decoding has become an urgent issue to be optimized.

Figure 8:
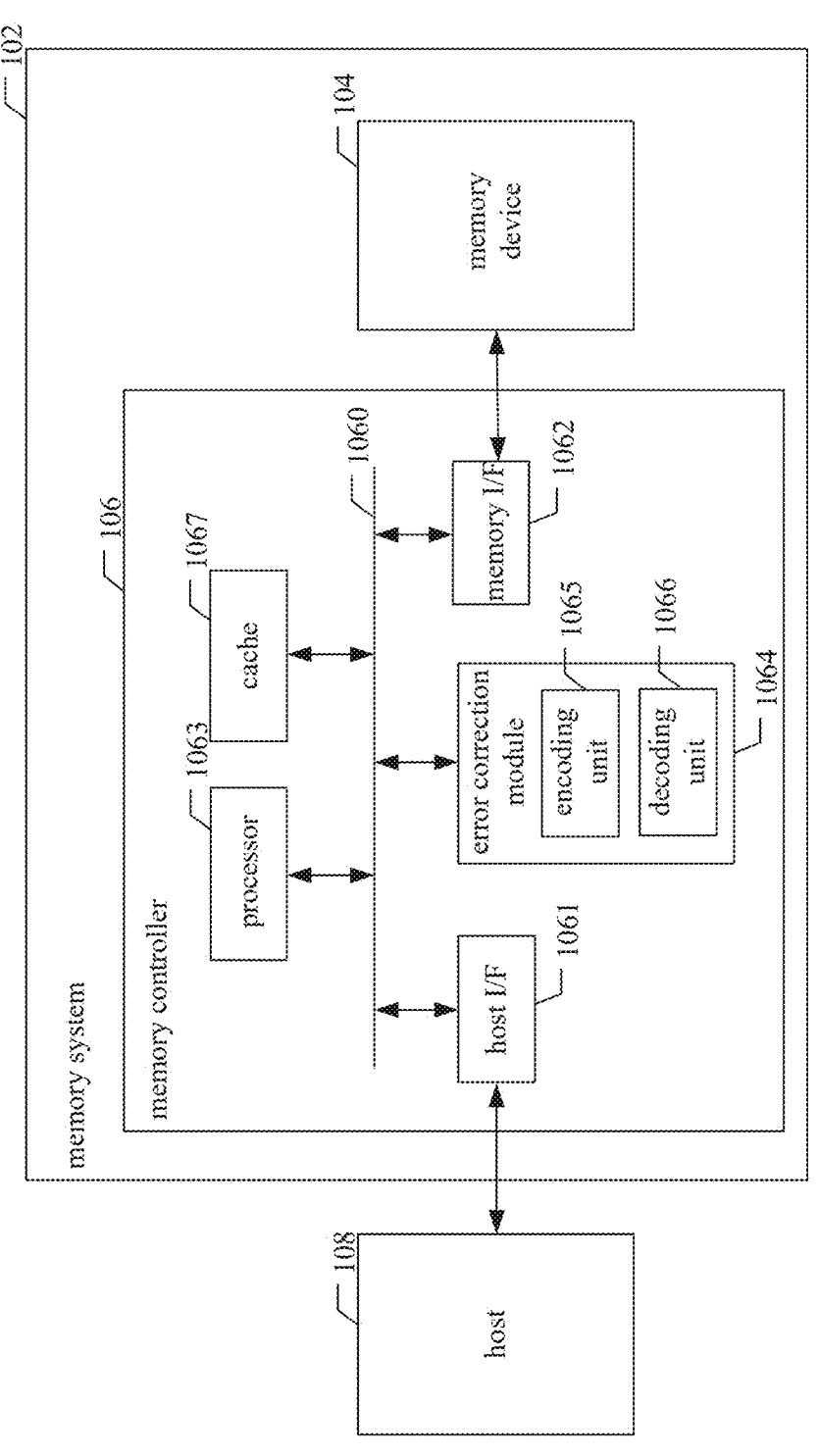
FIG. 8 is a schematic diagram of the composition structure of a memory system according to an example of the present application.

Based on one or more of the problems described above, in a first aspect, an example of this application proposes a memory system. As shown in FIG. 8, the memory system 102 includes: a memory device 104 including multiple memory cells, a preset number of the memory cells forming a codeword; a memory controller 106 coupled to the memory device 104 and configured to: obtain a first read result of the codeword at a first read level; according to the decoding failure of the first read result, obtain a second read result of the codeword at a second read level, wherein the first read level is different from the second read level; and perform decoding processing on the second read result based on a flipping result, wherein the flipping result includes information of the bits of the codeword flipped in the first read result and the second read result.

FIG. 8 illustrates a schematic structural diagram of a memory system. As shown in FIG. 8, the memory system 102 is connected to the host 108, wherein the memory system 102 may include: a memory controller 106 and a memory device 104, the memory controller 106 is configured to control the memory device 104 to perform operations such as read, write, and erase, and the memory controller 106 and the memory device 104 may also be coupled in any suitable manner. The memory controller 106 may include a host interface (I/F) 1061, a memory interface (I/F) 1062, a processor 1063, an error correction module 1064, a cache 1067, and a bus 1060. Wherein the host interface 1061 is a connection interface between the host 108 and the memory controller 106, the host interface 1061 allows the host and the memory controller to communicate according to a certain protocol, to send read request and write request, and to perform other operations. The memory interface 1062 is a connection interface between the memory controller 106 and the memory device 104, the memory interface 1062 is configured to implement data transmission between the memory controller 106 and the memory device 104. The processor 1063 is configured to control the memory system 102 as a whole, and in some examples, the processor 1063 may include one or more units with logical operation capabilities, e.g., a central processing unit (CPU) and/or a microcontroller unit (MCU), etc. The error correction module 1064 may further include an encoding unit 1065 and a decoding unit 1066; the encoding unit 1065 is configured to encode the data to be stored to obtain check data, and the decoding unit 1066 is configured to decode the check data to detect and correct possible erroneous data during data transmission. Cache 1067 is configured to cache data. In some examples, the cache 1067 may be a volatile memory device with a relatively fast read and write speed, e.g., a Static Random-Access Memory (SRAM) and/or a Dynamic Random Access Memory (DRAM).

In some examples, the memory system may include a solid state drive, and the memory device may include a NAND memory.

Here, the memory controller 106 is configured as, in some examples, a processor in the memory controller 106.

In some examples, a memory device includes multiple word lines and multiple memory cells coupled to each word line. All memory cells coupled to one word line form a physical page. A preset number of the memory cells form one code word (CW). A physical page includes one or more codewords.

In some examples, the number of memory cells included in one code word is the same as the number of memory cells included in one encoding or decoding when error correction encoding or decoding is being performed. In some examples, the number of memory cells included in one code word may be smaller than or equal to the number of memory cells coupled to one physical page, e.g., the number of memory cells included in one code word is ¼ of the number of memory cells coupled to one physical page. In some examples, a codeword may include memory cells with the number ranging from $2^4$ to $2^{12}$. Exemplarily, a codeword may include $2^4$, $2^8$, or $2^{12}$ memory cells.

In general, different memory systems may choose code words of different sizes to meet their requirement for performance, reliability, and storage. Memory cells in different types of memory devices (e.g., MLC, TLC or QLC) may store different number of bits. It may be understood that a code word may include multiple memory cells, and the number of memory cells included in a code word may be adjusted according to actual situations. It should be noted that in practice, there is some additional reserved space for management and error correction in a code word, thus the actual number of memory cells required may slightly exceed the calculation results described above.

In some examples, during the process of reading the memory device, one read operation reads the data of one physical page, and when the number of memory cells included in one codeword is smaller than the number of memory cells coupled to one physical page, the data read from the memory cells coupled to one physical page may be decoded accordingly according to the codewords.

In some examples, the first read level may be a default read level provided by the firmware according to the recorded information of the memory device, e.g., the experienced scene information, the default read level may be an empirical value, or may be a default value configured when the memory device leaves the factory, the empirical value or the default value is obtained through extensive simulation experiments before the memory device leaves the factory.

In some examples, after obtaining the first read level, the memory controller sends a first read command to the memory device. In response to the first read command, the memory device applies the first read level to the selected word line, obtains the first read result, and feeds back the first read result to the memory controller, and also feeds back the first check data corresponding to the first read result to the memory controller at the same time. The decoding unit 1066 in the memory controller uses the first check data to perform a decoding operation on the first read result. If the decoding is successful, the read operation ends, and if the decoding is unsuccessful, a second read level is obtained.

In some examples, the second read level may be the best read level (or referred to as the valley voltage) that is found, by the firmware according to the current read data situation of the memory device (e.g., the read result at the default read level) and in combination with a certain strategy, and is considered by the strategy to be the most suitable one for the current situation.

It should be noted that the default read level may be obtained based on the information of the memory device in combination with a large amount of simulation test data before leaving the factory, and may essentially be construed as the read level corresponding to a shift of the threshold voltage of the memory cell predicted according to empirical values; while the valley voltage is a read level that is calculated in combination with the current read data situation and that is relatively closer to an actual shift of the threshold voltage of the memory cell. That is to say, both the default read level and the valley voltage may differ from the read level corresponding to the actual shift of the threshold voltage of the memory cell to a certain extent, and using them as read levels to read data and perform corresponding decoding may still result in a decoding failure, however, compared with employing a read level corresponding to the case where the threshold voltage of the memory cell is not shifted, the probability of successful decoding is higher, and the default read level is generally closer to the valley voltage.

In some examples, the memory controller is configured to: obtain the first read level and the second read level, wherein the difference between the second read level and the first read level is smaller than a preset voltage.

It is to be understood that the preset voltage here is related to the characteristics of the memory device itself, and the preset voltage may be obtained through a large amount of test data. In some examples, the preset voltage may be 100 mV.

In some examples, the way to obtain the first read level, i.e., the default read level, may be to obtain the default read level by querying the mapping table according to the information of the recorded memory device, e.g., the experienced usage scenario information.

Here, there are many strategies for obtaining the second read level, i.e., the valley voltage, and the specific way of obtaining the valley voltage is not limited in the examples of the present application. A strategy for obtaining the valley voltage has been described above, and several more examples are given below.

In some examples, the memory cell may include a memory cell with P storage bits, wherein the P storage bits correspond to P pages respectively, and the P-bit memory cell read its P bits of storage data through Q read levels; where P, Q are both integers greater than 1, and $Q=2^P-1$. In some examples, before obtaining the first result corresponding to the at least one codeword at the target read level, the read mode of the memory device is set to a single level read (SLR) mode; the single-level read mode including reading at least one bit of the storage data stored in the memory cell through a first-level read level. In some examples, the valley voltage of all levels may be obtained by obtaining the valley voltage of a high order (one or more levels with a higher read level) through the aforementioned threshold condition determination, the first preset mapping function formula or the preset function model, and then generating the valley voltage of a low order (one or more levels with a higher read level) according to the valley voltage of a high order in combination with a second preset mapping function formula.

In some examples, after obtaining the second read level, the memory controller sends a second read command to the memory device. In response to the second read command, the memory device applies the second read level to the selected word line, obtains a second read result, and feeds back the second read result to the memory controller, and feeds back the second check data corresponding to the second read result to the memory controller at the same time. The decoding unit 1066 in the memory controller uses the second check data to perform a decoding operation on the second read result.

In some examples, after the second read result is obtained, a flipping result including information of bits of the codeword flipped in the first read result and the second read result is obtained.

Here, there are many ways to obtain the flipping result, the specific way to obtain the flipping result is not limited in the example of the present application, and two examples are given below.

In some examples, the memory controller is configured to: perform a logical operation on the first read result and the second read result to generate the flipping result. Here, the executive subject of generating the flipping result is the memory controller, and the memory controller may directly perform a logical operation, e.g., an XOR operation, on the first read result and the second read result to generate a flipping result. At this point, the bit with a logical operation result of 1 is the bit that is flipped in the first read result and the second read result.

In some examples, the memory device is configured to: perform a logical operation on the first read result and the second read result to generate the flipping result; and send the flipping result to the memory controller.

In some examples, the memory device further includes a first latch, a second latch and a third latch; wherein the first latch is configured to store the first read data; the second latch is configured to store the second read data; the third latch is configured to perform a logical operation on the first read result and the second read result to generate the flipping result.

Here, the executive subject of generating the flipping result is the memory device, and the memory device may generate the flipping result using latches in its page buffer, in some examples, storing the first read result in the first latch such as a data latch (D1 latch), and storing the second read result in the second latch such as a cache latch (C latch), using the third latch to perform a logical operation on the first read result and the second read result to obtain the flipping result, the flipping result may be first transferred to the cache latch and then sent to the controller from the cache latch. In this way, the data sensed at the default read level (the first read data or the first read result) may be directly used and stored in the page buffer, the data and a data read at the valley voltage (the second read data or the second read result) are XORed in the page buffer, thereby neither additional operation nor additional cache space is required, thus the solution is simple.

Figure 9:
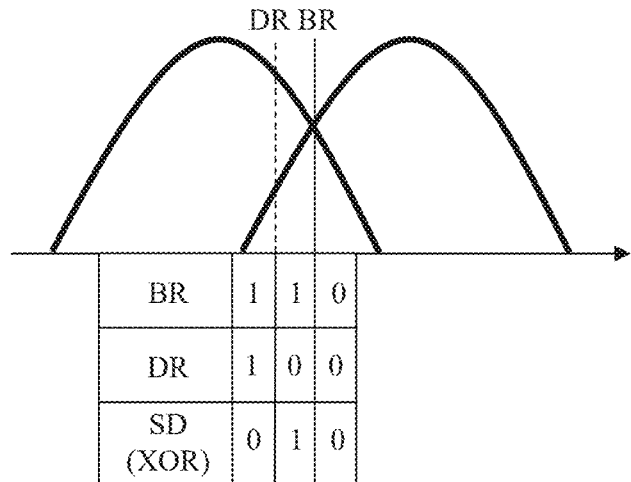
FIG. 9 is a schematic diagram of threshold voltage distribution of two adjacent storage states of a memory cell according to an example of the present application.

FIG. 9 is a schematic diagram showing threshold voltage distribution of two adjacent storage states of a memory cell. For example, as shown in FIG. 9, the horizontal axis in FIG. 9 is voltage, the vertical axis is the statistical number of the threshold voltages of the memory cell, the horizontal axis corresponding to DR represents the default read level, and the horizontal axis corresponding to BR represents the valley voltage. If being on the left side of the corresponding read level (less than the corresponding read level), the corresponding sensing result is 1; and if being on the right side of the corresponding read level (greater than the corresponding read level), the corresponding sensing result is 0. SD is the XOR operation result of the sensing result corresponding to BR and the sensing result corresponding to DR.

As described above, during the use of the memory system, different usage scenarios, e.g., long-time data retention, repeated read operations, cross-temperature environment, whether the memory block is fully written with data, the number of program times and erase times of the memory cell, etc., each will cause the threshold voltage distribution of the memory cell in the memory system to shift, although the firmware will provide a suitable default read level according to relevant information, it is impossible to guarantee that the corresponding read results at the default read level can be decoded successfully in every case, especially when the above-mentioned multiple scenarios are superimposed, the probability of read fail increases greatly.

At this point, some strategies are usually used to find the best read level (valley voltage), and then decoding may be performed again using the read result at the valley voltage. For some extreme cases, even if the best read level is found, error correction may not be successful, however, the default read level provided by the firmware based on the recorded memory device information is closer to the best read level, and the memory cells between the default read level and the best read level have a higher probability of error, therefore, the bit that flips in the read result corresponding to the best read level and the read result corresponding to the default read level is the bit with a higher error probability. The result of the XOR operation of the read result corresponding to the best read level and the read result corresponding to the default read level (e.g., the data corresponding to SD shown in FIG. 9) may be used as assistance information for decoding the read result at the best read level, this assistance information can not only improve the decoding capability and decoding efficiency, but also is simple and convenient to operate, and does not require introduce of additional resources but only requires the memory device to store the read data corresponding to DR and BR and the error correction algorithm code for adaptive modification.

It is to be noted that the timing of using the flipping result to assist in hard decoding of the second read data may be after the second read data is obtained and the decoding of the second read data by using second check data fails, at this point, decoding processing is performed on the second read data using the flipping result. The timing of using the flipping result to assist in hard decoding of the second read data may also be after the second read data is obtained, no decoding is performed, instead decoding processing is performed on the second read data directly using the second check data and the flipping result.

In some examples, the memory controller is configured to: after obtaining the second read result of the codeword at the second read level, perform decoding processing on the second read result; and according to the decoding failure of the second read result, perform decoding processing on the second read result based on the flipping result.

Figure 10:
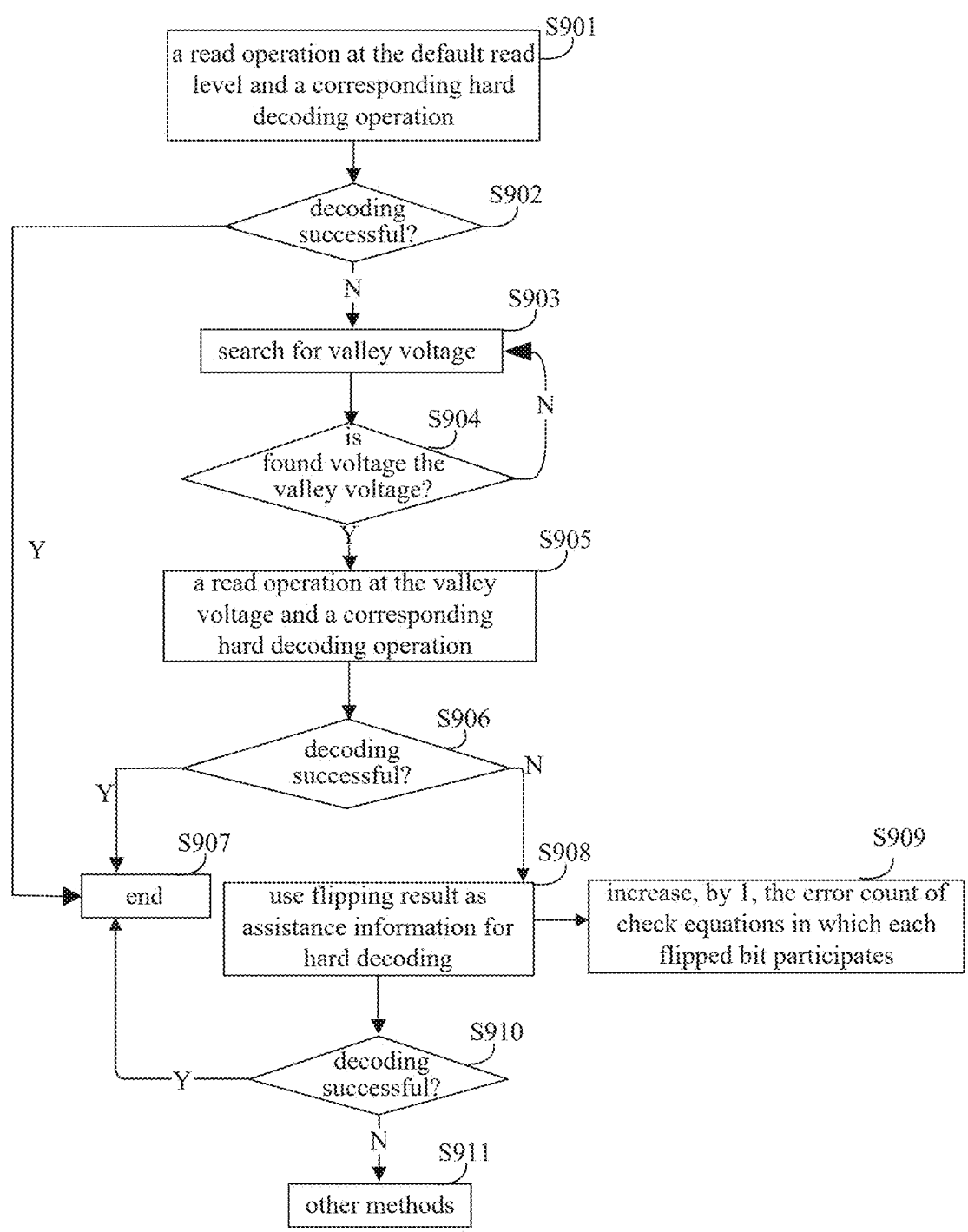
FIG. 10 is a schematic diagram 3 of an example read operation flow of a memory system according to an example of the present application.

FIG. 10 illustrates a schematic diagram of an example read operation flow of another memory system. For example, as shown in FIG. 10, when the memory controller controls the memory device to perform a read operation, operation S901 is performed on the memory cell of the corresponding physical address: a read operation at the default read level (i.e., obtain the first read result) and a corresponding hard decoding operation. Next, operation S902 is performed: determining whether the hard decoding corresponding to the read operation at the default read level is successful. When the hard decoding corresponding to the read operation at the default read level is successful, operation S907 is performed: terminating the read operation; when the hard decoding corresponding to the read operation at the default read level fails, operation S903 is performed: searching for the valley voltage and operation S904 is performed: determining whether the found voltage is the valley voltage, at this point, the iterative operation of searching may be performed repeatedly until the valley voltage is found. Next, operation S905 is performed: a read operation at the valley voltage (i.e., obtain the second read result) and a corresponding hard decoding operation. Next, operation S906 is performed: determining whether the hard decoding corresponding to the read operation at the valley voltage is successful. When the hard decoding corresponding to the read operation at the valley voltage is successful, operation S907 is performed: terminating the read operation; when the hard decoding corresponding to the read operation at the valley voltage fails, operation S908 is performed: use the flipping result as assistance information for hard decoding (of the read result at valley voltage), the specific assistance method may be to perform operation S909: obtain information of each flipped bit through the flipping result, and update the error counts of check equations which each flipped bit participates in, e.g., +1 for each error count. After completing the hard decoding of the second read data using the flipping result, operation S910 is performed: determining whether the hard decoding corresponding to the read operation at the valley voltage is successful. When the hard decoding corresponding to the read operation at the valley voltage is successful, operation S907 is performed: terminating the read operation; when the hard decoding corresponding to the read operation at the valley voltage fails, operation S911 is performed: employing other methods to perform error correction of the read operation, e.g., the aforementioned soft decoding operation.

In some examples, the memory controller is configured to: after obtaining the second read result of the codeword at the second read level, perform decoding processing on the second read result directly based on the flipping result.

Figure 11:
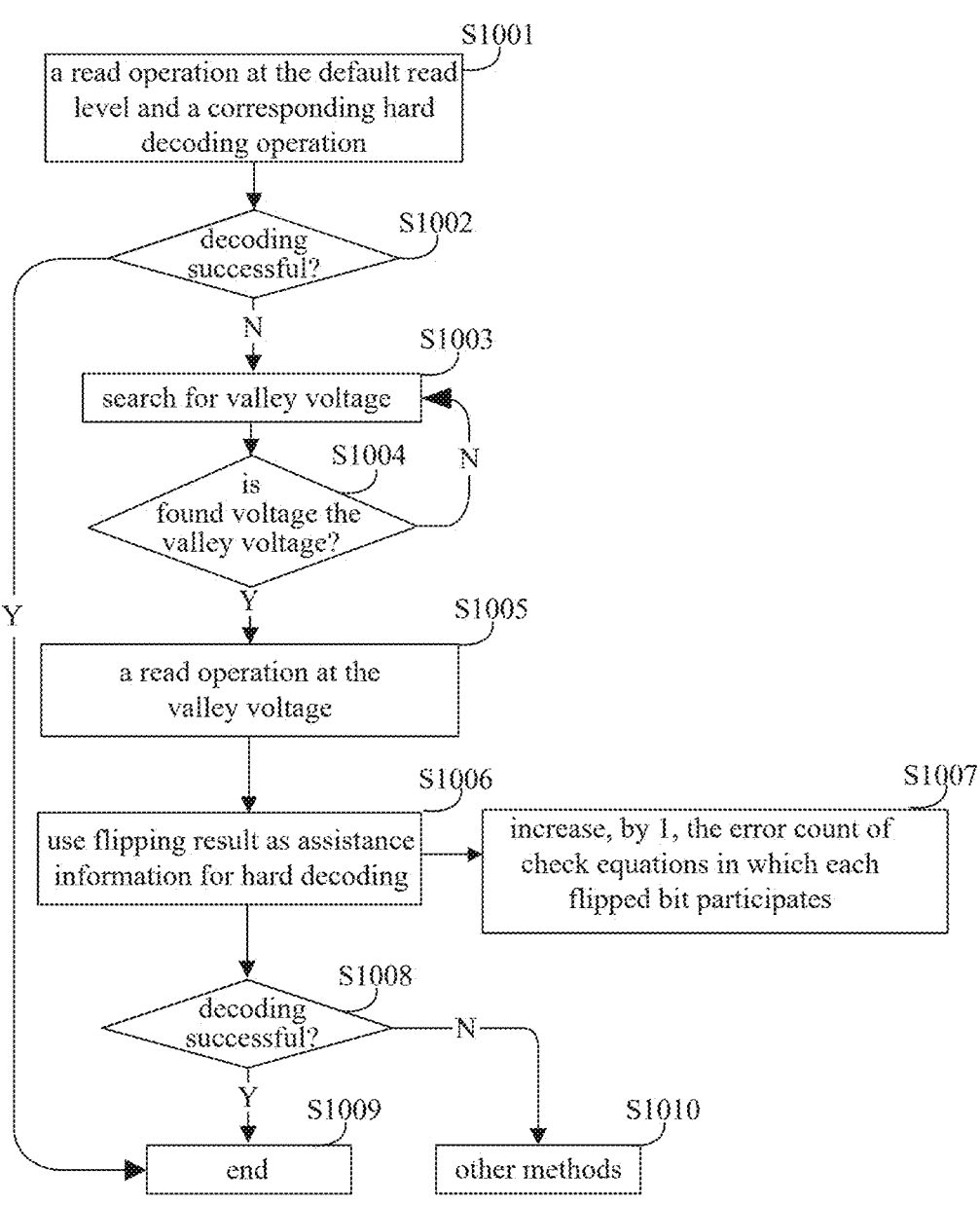
FIG. 11 is a schematic diagram 4 of an example read operation flow of a memory system according to an example of the present application.

FIG. 11 also illustrates a schematic diagram of an example read operation flow of a memory system. For example, as shown in FIG. 11, when the memory controller controls the memory device to perform a read operation, operation S1001 is performed on the memory cell of the corresponding physical address: a read operation at the default read level (i.e., obtain the first read result) and a corresponding hard decoding operation. Next, operation S1002 is performed: determining whether the hard decoding corresponding to the read operation at the default read level is successful. When the hard decoding corresponding to the read operation at the default read level is successful, operation S1009 is performed: terminating the read operation; when the hard decoding corresponding to the read operation at the default read level fails, operation S1003 is performed: searching for the valley voltage and operation S1004 is performed: determining whether the found voltage is the valley voltage, at this point, the iterative operation of searching may be performed repeatedly until the valley voltage is found. Next, operation S1005 is performed: a read operation at the valley voltage (i.e., obtain the second read result). Next, operation S1006 is performed: use the flipping result as assistance information for hard decoding (the read result at the valley voltage), the specific assistance method may be to perform operation S1007: obtain information of each flipped bit through the flipping result, and update the error counts of check equations which each flipped bit participates in, e.g., +1 for each error count. After completing the hard decoding of the second read data using the flipping result, operation S1008 is performed: determining whether the hard decoding corresponding to the read operation at the valley voltage is successful. When the hard decoding corresponding to the read operation at the valley voltage is successful, operation S1009 is performed: terminating the read operation; when the hard decoding corresponding to the read operation at the valley voltage fails, operation S1010 is performed: employing other methods to perform error correction of the read operation, e.g., the aforementioned soft decoding operation.

The following will introduce how to use the flipping result to assist in hard decoding. The Bit-Flipping hard decoding algorithm in LDPC is taken as an example for illustration.

Figure 12:
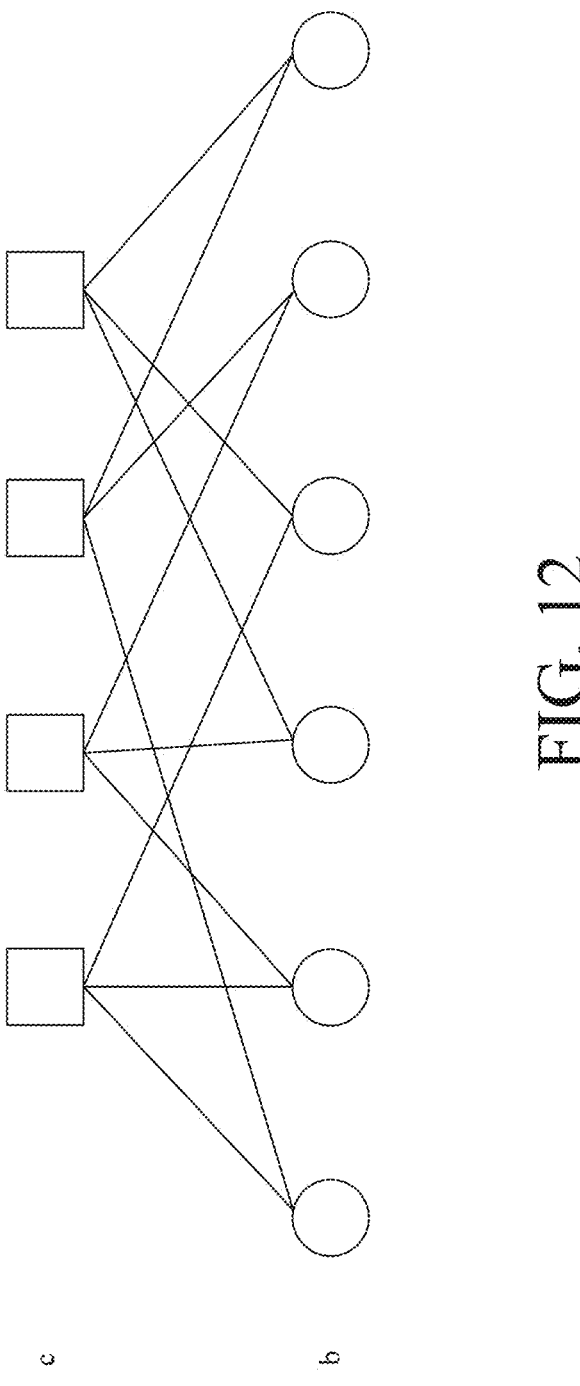
FIG. 12 shows a Tanner diagram reflecting the relationship between data bits and check equations in LDPC error correction according to an example of the present application.

FIG. 12 shows a Tanner diagram of the relationship between data bits and check equations in LDPC error correction. FIGS. 13A to 13D show a schematic diagram of implementing the process of the Bit-Flipping hard decoding algorithm.

Exemplarily, as shown in FIG. 12, b represents a bit node, which indicates a data bit to be decoded, and c represents a check node, which indicates a check equation. Assume that the signal encoding length is n, where each bit is represented by one b node. The number of check equations is r, and each check equation is represented by one c node. If a b node $b_i$ participates in the check equation of a c node $c_j$, then the b node $b_i$ and the c node $c_j$ are connected. In FIG. 12, the b node is represented by a circle, and the c node is represented by a square. Each b node is connected to 2 c nodes, and each c node is connected to 3 b nodes.

It is to be noted that the number of b nodes and c nodes in FIG. 12 are only for illustration and are not used to limit the number of data bits (read data) to be decoded in a codeword and the number of decoding equations in the example of the present application.

An n-bit signal y ($y_1$, $y_2$, . . . $y_n$) and a check matrix H are given. A Tanner graph corresponding to the H matrix is drawn, e.g., FIG. 12. The n-bit signal corresponds to n b nodes and r c nodes. The algorithm of Bit-Flipping decoding is as follows:

Operation 1) Each b node sends whether itself is 0 or 1 to the c nodes connected to it. Initially, the i-th bit sends the initial value $y_i$.

Operation 2) Each c node receives information of many b nodes, and each c node represents one check equation. If the equation is satisfied, the c node sends back the message of each b node intactly; while if the check fails, the c node inverts the message sent by each b node and sends it back.

Operation 3) Each b node is connected to multiple c nodes, and after a b node receives all the messages from the c nodes, the b node uses voting method to update the message output in this round. The initial value of each bit involves in the vote. The principle of vote may be that the minority obeys the majority.

Operation 4) After the b node is updated, the stop condition: all the check equations are satisfied or the number of iterations exceeds the upper limit. If the stop condition is not satisfied, it is required to go to operation 1) to continue the iteration.

Exemplarily, signal y=[1 0 1 0 1 1] is input and the operation 1) described above is performed, as shown in FIG. 13A, the solid arrow indicates that the information transmitted is 1, and the dotted arrow indicates that the information transmitted is 0. The operation 2) described above is performed, as shown in FIG. 13B, the c node sends a message back to each b node. The c node that satisfies the check equation returns the message intactly, and the c node that does satisfy the check equation inverts the message and send it back. The operation 3) described above is performed, as shown in FIG. 13C, the voting method votes and re-updates the value of the b node, and flips the value corresponding to the b node connected to the biggest number of check equations that are not satisfied (that is, the leftmost b node) (the value changes from 1 to 0). The operation 4)

described above is performed, as shown in FIG. 13D, the nodes are rechecked by using the value corresponding to the updated b node, and if the check equations are satisfied, and the operation ends.

Each of the above b nodes may correspond to each data bit in the first read result or the second read result in the examples of the present application, and the each data bit will also participate in the check calculation of multiple aforementioned check equations.

In some examples, the memory controller is configured to: for each of all the bits flipped in the flipping result, update the error count of the check equations in which each bit participates during the decoding processing; select a bit, among all the bits, which participates in check equations with an error count satisfying a preset condition, and flip the value of the selected bit in the second read result; and continue the decoding processing based on the flipped data.

As mentioned above, the first read level (e.g., the default read level) is relatively close to the second read level (e.g., the valley voltage), and the memory cell with a threshold voltage between the first read level and the second read level has a relatively high error probability, that is, each of all the bits flipped in the flipping result has a relatively high error probability.

Figure 13A:
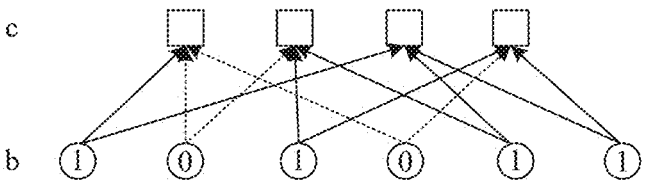
FIGS. 13A to 13D show a schematic diagram of the implementation process of the Bit-Flipping hard decoding algorithm according to an example of the present application.
Figure 13B:
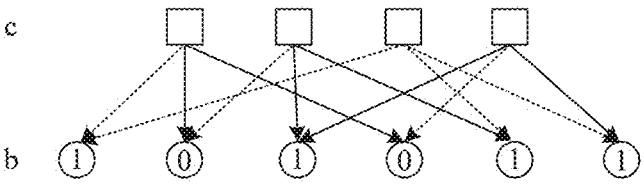
Figure 13C:
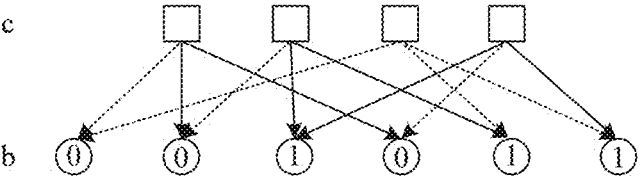
Figure 13D:
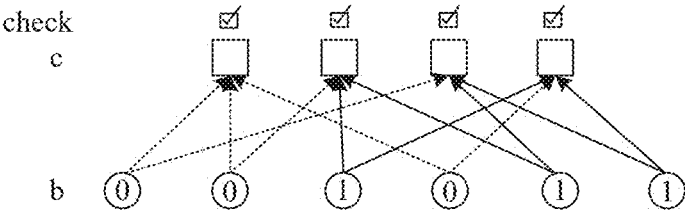

In the example operation 3) of the aforementioned Bit-Flipping hard decoding algorithm, the error count of the check equations in which each b node participates will be counted according to the number of inversions fed back by the c nodes, and the value of the b node will be voted and re-updated by voting method. In FIG. 13C, the error count of the check equations in which each b node participates is the number of dotted arrows connected to each b node, and from left to right, the error counts of the check equations in which the b nodes participate are 2, 1, 0, 1, 1, 1, respectively, voting shows that the error count of the check equations in which the leftmost b node participates is the largest, and the value of the leftmost b node is flipped.

In the example of the present application, for each of all the bits flipped in the flipping result, update the error count of the check equations in which each bit participates during the decoding processing. In some examples, the memory controller is configured to: for each of all the bits flipped in the flipping result, increase, by 1, the error count of the check equations in which each bit participates during the decoding processing.

Then, for all updated bits, select a bit, among all the bits, which participates in the check equations with an error count satisfying a preset condition, and the value of the selected bit in the second read result is flipped; and the decoding processing is continued based on the flipped data.

In some examples, the memory controller is configured to: select a bit, among all the bits, which participates in check equations with a highest error count; or, select a bit, among all the bits, which participates in the check equations with an error count greater than or equal to a preset value.

Exemplarily, for some hard decoding algorithms, e.g., BF/GDBF algorithm, for the error count f of the check equations in which each data bit (i.e., each b node) participates, when the XOR result of the corresponding data bit is 1, f=f+1, while when f=$f_{MAX}$, the data bit corresponding to the f is flipped; where $f_{MAX}$ is the maximum value of error counts of the equations in which the data bit participates. In this example, only one data bit is flipped at a time.

Exemplarily, for other hard decoding algorithms, e.g., DTBF algorithm, for the error count f of the check equations in which each data bit (i.e., each b node) participates, when the XOR result of the corresponding data bit is 1, f=f+1.

when f≥Th, flip the data bit corresponding to f; wherein Th is the set flipping threshold, i.e., the preset value. The preset value here may be adjusted according to the actual situation. In this example, one data bit or multiple data bits greater than or equal to the preset value may be flipped at a time.

In some examples, the memory controller is configured to: go through multiple data check iterations during the decoding processing on the second read result, wherein data flipping is performed based on the flipping result in one of the data check iterations, or data flipping is performed based on the flipping result in each of the data check iterations.

In the example operation 4 of the aforementioned Bit-Flipping hard decoding algorithm, if the stop condition is not satisfied, it is required to go to operation 1) to continue the iteration, that is, one decoding operation or one decoding processing may go through one or more data check iterations. The decision of whether to perform corresponding data bit flipping based on the flipping result may use one of the multiple data check iterations or each of the multiple data check iterations.

In some examples, the memory controller is configured to: after obtaining the first read result and the second read result, perform first decision decoding processing on the first read result respectively; based on the flipping result, perform first decision decoding processing on the second read result; and according to a failure of performing first decision decoding processing on the second read result based on the flipping result, perform second decision decoding processing on the second read result, wherein the processing efficiency of the second decision decoding processing is lower than the processing efficiency of the first decision decoding processing.

Here, the first decision decoding processing may be understood as the aforementioned hard decoding or hard decision decoding, and the second decision decoding processing may be understood as the aforementioned soft decoding or soft decision decoding. It is to be noted that soft decision decoding has a stronger error correction capability than hard decision decoding, but consumes longer time on average and occupies more resources. Based on this, it is generally hoped that hard decision decoding can succeed, and soft decision decoding will not be involved.

Figure 14:
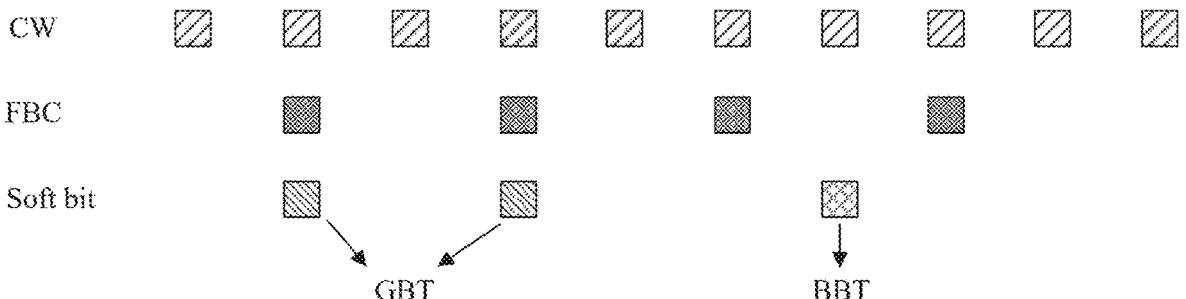
FIG. 14 shows a schematic diagram of the data relationship between codewords, failed bits, and flipped bits according to an example of the present application.

FIG. 14 shows a schematic diagram of a data relationship between codewords, failed bits, and flipped bits. As mentioned above, the FW of the memory system will give an appropriate default read level according to the different conditions experienced by the memory device, and the default read level is within 100 mV from the best read level. Based on these premises, e.g., as shown in FIG. 14, cw represents the codeword, FBC represents the failed bit count, GBT represents the correctly flipped bit count found using the flipping result, and BBT represents the incorrectly flipped bit count found using the flipping result, here, P1 represents the probability of finding the correctly flipped bit using the flipping result, and P2 represents the probability of finding the incorrectly flipped bit using the flipping result. $P1=GBT/FBC=\frac{2}{4}=\frac{1}{2}$; $P2=BBT/(cw-FBC)=1/(10-4)=\frac{1}{6}$. It may be seen that the probability of finding the correct flip using the flipping result is much greater than the probability of finding the wrong flip using the flipping result, that is, using the flipping result to assist decoding has a positive and effective effect.

Figure 15:
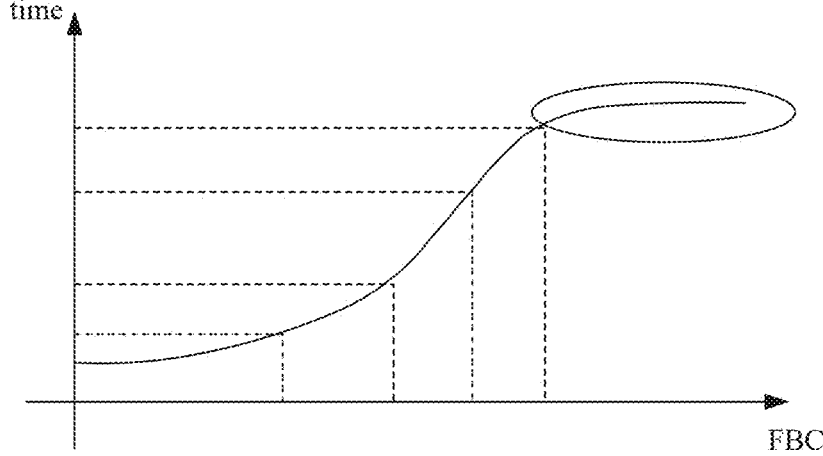
FIG. 15 shows a schematic diagram of the relationship between the number of failed bits FBC and the error correction time according to an example of the present application.

FIG. 15 shows a schematic diagram of a relationship between the number of failed bits FBC and the error correction time. As shown in FIG. 15, the horizontal axis is FBC and the vertical axis is the time, and it may be seen that as FBC increases, the time consumed for error correction increases, and when FBC exceeds a certain threshold, decoding fails (the curve part circled by the ellipse in FIG. 15). For example, in an example where the decoding is not assisted with the flipping result, as in the example shown in FIG. 7, the total time duration of the read operation=$t_{DR}$+$t_{DC}$+$t_{SLR}$+$t_{BR}$+$t_{DC}$+$t_{trans}$=45+$t_{SLR}$+45+2$t_{DC}$+1=91+$t_{SLR}$+2$t_{DC}$(us); and in an example where the decoding is assisted with the flipping result, as in the example shown in FIG. 11, the total time duration of the read operation=$t_{DR}$+$t_{DC}$+$t_{SLR}$+$t_{xor}$+$t_{BR}$+$t_{DC}$+$t_{trans}$=45+$t_{SLR}$+3+45+2$t_{DC}$+1=95+$t_{SLR}$+2$t_{DC}$ (us); wherein, $t_{SLR}$ is the time duration for searching for the valley voltage; $t_{DC}$ is the time duration for hard decoding. It can be seen that the total time duration of the read operation using the flipping result to assist decoding is slightly longer than the total time duration of the read operation not using the flipping result to assist decoding, that is to say, using the flipping result to assist decoding will lose a little processing time for XOR (i.e., txor), however, in conjunction with FIG. 15, when FBC reaches 400, $t_{DC}$ is greater than 30 us, and the increased txor(3 us) is not worth mentioning compared to $t_{DC}$, but it may improve decoding capability and decoding efficiency, and the overall benefit is greater.

In the example of the present application, factors such as data retention and data interference in the memory system are inherent properties of the memory device, e.g., NAND memory, and as the number of word lines and corresponding coupled memory cell layers increases, the reliability of the memory device deteriorates and the probability of read fail increases. The hard decoding capabilities of error correction algorithms such as LDPC have not been significantly improved, and entering soft decoding will greatly affect the performance of the memory device. Although methods of finding the valley voltage is proposed in some examples, however, for the superposition of various scenarios, the found valley voltage may still have the issue of read fail, and the read result at the default read level and the XOR result of the read result at the default read level may provide assistance information. By using the latch in the page buffer of the memory device to save the read result at the default read level, and in the latch in the page buffer, directly performing an XOR operation on the read result at the default read level and the read result at the default read level, additional assistance information (flipping result) is obtained to assist in decoding. The examples of the present application can obtain soft information (flipping result) without entering soft decoding, which not only improves decoding capabilities, but also saves time and improves efficiency. Meanwhile, through fully utilizing the data of each read operation, soft information may be obtained by performing an XOR operation directly in the page buffer without additional read operations, therefore the operation is simple, easy to implement and cost-saving.

The examples of the present application further provide an operating method for a memory system, as shown in FIG. 16, wherein the operating method includes:

Operation 1601: obtaining a first read result of a codeword formed by multiple memory cells in the memory system at a first read level;

Operation 1602: according to the decoding failure of the first read result, obtaining a second read result of the codeword at a second read level, wherein the first read level is different from the second read level; and Operation 1603: performing decoding processing on the second read result based on a flipping result, wherein the flipping result includes information of the bits of the codeword flipped in the first read result and the second read result.

It is to noted that the operating method for a memory system may be understood with reference to the corresponding configuration of the memory system in the aforementioned example.

In some examples, each data bit in the first read result and the second read result participates in the check calculation of multiple check equations, the method further includes: after obtaining the second read result of the codeword at the second read level, performing decoding processing on the second read result; and according to the decoding failure of the second read result, performing decoding processing on the second read result based on the flipping result.

In some examples, the performing decoding processing on the second read result based on the flipping result includes: for each of all the bits flipped in the flipping result, updating the error count of the check equations in which each bit participates during the decoding processing; selecting a bit, among all the bits, which participates in check equations with an error count satisfying a preset condition, and flipping the values of the selected bit in the second read result; and continuing the decoding processing based on the flipped data.

In some examples, selecting a bit, among all the bits, which participates in check equations with an error count satisfying a preset condition includes: selecting a bit, among all the bits, which participates in check equations with a highest error count; or, selecting a bit, among all the bits, which participates in the check equations with an error count greater than or equal to a preset value.

In some examples, the method further includes: going through multiple data check iterations during the decoding processing on the second read result, wherein data flipping is performed based on the flipping result in the first one of the data check iterations, or data flipping is performed based on the flipping result in each of the data check iterations.

In some examples, the for each of all the bits flipped in the flipping result, updating the error count of the check equations in which each bit participates during the decoding processing includes: for each of all the bits flipped in the flipping result, increasing, by 1, the error count of the check equations in which each bit participates during the decoding processing.

In some examples, the method further includes: performing a logical operation on the first read result and the second read result to generate the flipping result.

In some examples, the method further includes: receiving the flipping result generated by the memory device in the memory system.

In some examples, the method further includes: obtaining the first read level and the second read level, wherein the difference between the second read level and the first read level is less than a preset voltage.

In some examples, the method further includes: after obtaining the first read result and the second read result, performing first decision decoding processing on the first read result respectively; based on the flipping result, performing first decision decoding processing on the second read result; and according to a failure of performing first decision decoding processing on the second read result based on the flipping result, performing second decision decoding processing on the second read result, wherein the processing efficiency of the second decision decoding processing is lower than the processing efficiency of the first decision decoding processing.

The examples of present application further proposes a storage medium, executable instructions are stored on the storage medium, and the executable instructions, when executed, may implement the operations of the methods described in the examples of the present application.

In some examples, the storage medium may be memory such as Ferromagnetic Random Access Memory (FRAM), Read Only Memory (ROM), Programmable Read-Only Memory (PROM), Erasable Programmable Read-Only Memory (EPROM), Electrically Erasable Programmable Read-Only Memory (EEPROM), Flash Memory, Magnetic Surface Memory, Optical Disk, or Compact Disc Read-Only Memory (CD-ROM); or may also be various devices including one or any combination of the memory devices described above.

In some examples, executable instructions may take the form of a program, software, software module, script, or code, may be written in any form of programming language (including compiled or interpreted languages, or declarative or procedural languages), and may be deployed in any form, including being deployed as a stand-alone program or as a module, component, subroutine, or other unit suitable for use in a computing environment.

As an example, executable instructions may, but do not necessarily, correspond to files in a file system, and may be stored as part of a file storing other programs or data, e.g., one or more scripts stored in a HyperText Markup Language (HTML) document, may be stored in a single file specific to the program discussed, or may be stored in multiple collaborative files (e.g., files that store one or more modules, subroutines, or portions of code).

As an example, executable instructions may be deployed to execute on one electronic device, or to execute on multiple electronic devices located at one location, or to execute on multiple electronic devices distributed across multiple locations and interconnected by a communications network.

Figure 17:
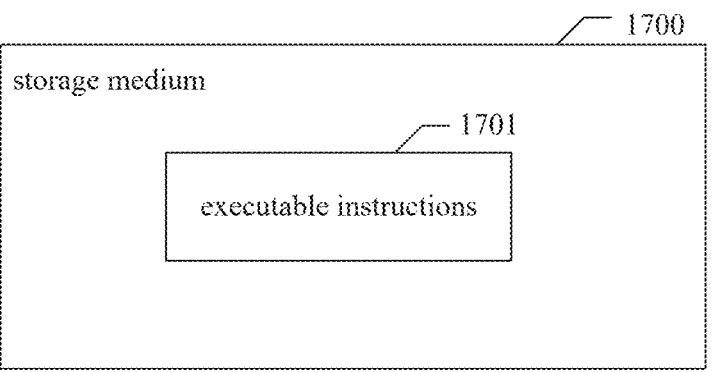
FIG. 17 is a schematic structural diagram of a storage medium according to an example of the present application.

FIG. 17 is a block diagram of a readable storage medium provided by an example of the present application. An example of the present disclosure provides a readable storage medium, the storage medium 1700 stores executable instructions 1701, and when the executable instructions 1701 are executed by a processor, the operating method for the memory system in the technical solution as described above may be implemented. The operating method includes: obtaining a first read result of a codeword formed by multiple memory cells in the memory system at a first read level; according to the decoding failure of the first read result, obtaining a second read result of the codeword at a second read level, wherein the first read level is different from the second read level; and performing decoding processing on the second read result based on the flipping result, wherein the flipping result includes information of the bits of the codeword flipped in the first read result and the second read result.

It should be understood that "one example" or "an example" referred to throughout the description means that particular features, structure or characteristic related to an example is included in at least one example of the present application. Thus, "in one example" or "in an example" present in various places throughout the description not necessarily refer to a same example. Furthermore, these particular features, structures or characteristics may be combined in any appropriate manner in one or more examples. It should be understood that in various examples of the present application, sequence numbers of the processes described above do not mean the execution order, and the execution order of each process should be determined by its function and internal logic, and should not constitute any limitation to implementation process of examples of the present application. The serial numbers of examples of the present application described above are for the purpose of description only, and do not represent the advantages and disadvantages of the examples.

The above is only preferred implementations of the present application, and does not limit the patent scope of the present application, and under the inventive concept of the present application, any equivalent structural transformation made by using content of the present application and the accompanying drawings, or direct/indirect application in other related technical fields are included in the patent protection scope of the present application.

What is claimed is:

1. A memory system including:
   a memory device including multiple memory cells, a preset number of the memory cells forming a codeword; and
   a memory controller coupled to the memory device and configured to:
      obtain a first read result of the codeword at a first read level;
      responsive to occurence of a decoding failure of the first read result, obtain a second read result of the codeword at a second read level, wherein the first read level is different from the second read level; and
      perform decoding processing on the second read result based on a flipping result, wherein the flipping result includes information of bits of the codeword flipped in the first read result and the second read result.

2. The memory system of claim 1, wherein the memory controller is configured to:
   after obtaining the second read result of the codeword at the second read level, perform decoding processing on the second read result; and
   responsive to occurence of a decoding failure of the second read result, perform decoding processing on the second read result based on the flipping result.

3. The memory system of claim 1, wherein each bit in the first read result and the second read result participates in check calculation of multiple check equations, and the memory controller is configured to:
   for each of the bits of the codeword indicated as flipped in the flipping result, update an error count of the check equations in which each of the bits in the first and second read results participates during the decoding processing;
   select a bit, among all the bits of the codeword, which participates in the check equations with the respective error count satisfying a preset condition, and flip a value of the selected bit in the second read result; and
   continue the decoding processing based on the flipped value of the selected bit.

4. The memory system of claim 3, wherein the memory controller is configured to:
   select a bit, among all the bits of the codeword, which participates in the check equations with a highest error count.

5. The memory system of claim 3, wherein the memory controller is configured to:
   go through multiple data check iterations during the decoding processing on the second read result, wherein data flipping is performed based on the flipping result in one of the data check iterations.

6. The memory system of claim 3, wherein the memory controller is configured to:
   for each of all the bits of the codeword indicated as flipped in the flipping result, increase, by 1, the error count of the check equations in which each of the bits in the first and second read results participates during the decoding processing.

7. The memory system of claim 1, wherein the memory controller is configured to:
   perform a logical operation on the first read result and the second read result to generate the flipping result.

8. The memory system of claim 1, wherein the memory device is configured to:
   perform a logical operation on the first read result and the second read result to generate the flipping result; and
   send the flipping result to the memory controller.

9. The memory system of claim 8, wherein the memory device further includes:
   a first latch configured to store the first read result;
   a second latch configured to store the second read result; and
   a third latch configured to perform a logical operation on the first read result and the second read result to generate the flipping result.

10. The memory system of claim 1, wherein the memory controller is configured to:
   obtain the first read level and the second read level, wherein a difference between the second read level and the first read level is less than a preset voltage.

11. The memory system of claim 2, wherein the memory controller is configured to:
   after obtaining the first read result and the second read result, perform first decision decoding processing on the first read result;
   based on the flipping result, perform the first decision decoding processing on the second read result; and
   responsive to occurence of a failure of performing the first decision decoding processing on the second read result based on the flipping result, perform second decision decoding processing on the second read result, wherein processing efficiency of the second decision decoding processing is lower than processing efficiency of the first decision decoding processing.

12. An operating method for a memory system, including:
   obtaining a first read result of a codeword formed by multiple memory cells in the memory system at a first read level;
   determining existence of a decoding failure of the first read result;
   responsive to the decoding failure of the first read result, obtaining a second read result of the codeword at a second read level, wherein the first read level is different from the second read level; and
   performing decoding processing on the second read result based on a flipping result, wherein the flipping result includes information of bits of the codeword flipped in the first read result and the second read result.

13. The operating method of claim 12, wherein each bit in the first read result and the second read result participates in check calculation of multiple check equations, and the method further includes:
   after obtaining the second read result of the codeword at the second read level, performing decoding processing on the second read result;
   determining existence of a decoding failure of the second read result; and responsive to the decoding failure of the second read result, performing decoding processing on the second read result based on the flipping result.

14. The operating method of claim 12, wherein performing decoding processing on the second read result based on the flipping result includes:
  for each of the bits of the codeword indicated as flipped in the flipping result, updating an error count of check equations in which each of the bits in the first and second read results participates during the decoding processing;
  selecting a bit, among all the bits of the codeword, which participates in the check equations with the respective error count satisfying a preset condition, and flipping a value of the selected bit in the second read result; and
  continuing the decoding processing based on the flipped value of the selected bit.

15. The operating method of claim 14, wherein selecting a bit, among all the bits of the codeword, which participates in the check equations with the respective error count satisfying the preset condition includes:
  selecting a bit, among all the bits of the codeword, which participates in the check equations with a highest error count.

16. The operating method of claim 14, further including:
  going through multiple data check iterations during the decoding processing on the second read result, wherein data flipping is performed based on the flipping result in a first one of the data check iterations.

17. The operating method of claim 14, wherein for each of the bits of the codeword flipped in the flipping result, updating the error count of the check equations in which each of the bits in the first and second read results participates during the decoding processing includes:
  for each of the bits of the codeword flipped in the flipping result, increasing, by 1, the error count of the check equations in which each of the bits in the first and second read results participates during the decoding processing.

18. The operating method of claim 12, further including:
  performing a logical operation on the first read result and the second read result to generate the flipping result;
  receiving the flipping result generated by a memory device in the memory system.

19. The operating method of claim 12, further including:
  obtaining the first read level and the second read level, wherein a difference between the second read level and the first read level is less than a preset voltage.

20. The operating method of claim 13, further including:
  after obtaining the first read result and the second read result, performing first decision decoding processing on the first read result;
  based on the flipping result, performing the first decision decoding processing on the second read result;
  determining existence of a failure of performing the first decision decoding processing on the second read result based on the flipping result; and
  responsive to the failure of performing the first decision decoding processing on the second read result based on the flipping result, performing second decision decoding processing on the second read result, wherein processing efficiency of the second decision decoding processing is lower than processing efficiency of the first decision decoding processing.

* * * * *